(12) United States Patent
Malisiewicz et al.

(10) Patent No.: US 10,621,747 B2
(45) Date of Patent: Apr. 14, 2020

(54) DEEP LEARNING SYSTEM FOR CUBOID DETECTION

(71) Applicant: Magic Leap, Inc., Plantation, FL (US)

(72) Inventors: Tomasz Jan Malisiewicz, Mountain View, CA (US); Andrew Rabinovich, San Francisco, CA (US); Vijay Badrinarayanan, Mountain View, CA (US); Debidatta Dwibedi, Pittsburgh, PA (US)

(73) Assignee: Magic Leap, Inc., Plantation, FL (US)

( * ) Notice: Subject to any disclaimer, the term of this patent is extended or adjusted under 35 U.S.C. 154(b) by 282 days.

(21) Appl. No.: 15/812,928

(22) Filed: Nov. 14, 2017

(65) Prior Publication Data

US 2018/0137642 A1    May 17, 2018

Related U.S. Application Data

(60) Provisional application No. 62/422,547, filed on Nov. 15, 2016.

(51) Int. Cl.
| | |
|---|---|
| *G06T 7/70* | (2017.01) |
| *G06N 3/04* | (2006.01) |
| *G06K 9/62* | (2006.01) |
| *G06K 9/46* | (2006.01) |
| *G06N 3/08* | (2006.01) |
| *G06K 9/00* | (2006.01) |

(Continued)

(52) U.S. Cl.
CPC ............ *G06T 7/70* (2017.01); *G06K 9/00201* (2013.01); *G06K 9/4628* (2013.01);
(Continued)

(58) Field of Classification Search
None
See application file for complete search history.

(56) References Cited

U.S. PATENT DOCUMENTS

| | | |
|---|---|---|
| 5,291,560 A | 3/1994 | Daugman |
| 5,583,795 A | 12/1996 | Smyth |

(Continued)

FOREIGN PATENT DOCUMENTS

| | | |
|---|---|---|
| WO | WO 2014/182769 | 11/2014 |
| WO | WO 2015/161307 | 10/2015 |

(Continued)

OTHER PUBLICATIONS

Aubry M. et al., "Seeing 3D chairs: exemplar part-based 2D-3D alignment using a large dataset of CAD models", *Proceedings of the IEEE Conference on Computer Vision and Pattern Recognition* (Jun. 23-28, 2014); Computer Vision Foundation—Open Access Version in 8 pages.

(Continued)

*Primary Examiner* — Anand P Bhatnagar
(74) *Attorney, Agent, or Firm* — Knobbe, Martens, Olson & Bear, LLP

(57) ABSTRACT

Systems and methods for cuboid detection and keypoint localization in images are disclosed. In one aspect, a deep cuboid detector can be used for simultaneous cuboid detection and keypoint localization in monocular images. The deep cuboid detector can include a plurality of convolutional layers and non-convolutional layers of a trained convolution neural network for determining a convolutional feature map from an input image. A region proposal network of the deep cuboid detector can determine a bounding box surrounding a cuboid in the image using the convolutional feature map. The pooling layer and regressor layers of the deep cuboid detector can implement iterative feature pooling for determining a refined bounding box and a parameterized representation of the cuboid.

25 Claims, 20 Drawing Sheets

(51) Int. Cl.
*G06T 7/11* (2017.01)
*G06K 9/66* (2006.01)

(52) U.S. Cl.
CPC ............ *G06K 9/6271* (2013.01); *G06K 9/66* (2013.01); *G06N 3/0445* (2013.01); *G06N 3/0454* (2013.01); *G06N 3/08* (2013.01); *G06N 3/084* (2013.01); *G06T 7/11* (2017.01); *G06T 2210/12* (2013.01)

(56) References Cited

U.S. PATENT DOCUMENTS

| | | |
|---|---|---|
| 6,850,221 B1 | 2/2005 | Tickle |
| D514,570 S | 2/2006 | Ohta |
| 7,771,049 B2 | 8/2010 | Knaan et al. |
| 7,970,179 B2 | 6/2011 | Tosa |
| 8,059,120 B2 * | 11/2011 | Hashima ................ G06T 19/00 345/419 |
| 8,098,891 B2 | 1/2012 | Lv et al. |
| 8,341,100 B2 | 12/2012 | Miller et al. |
| 8,345,984 B2 * | 1/2013 | Ji ...................... G06K 9/00335 382/190 |
| 8,363,783 B2 | 1/2013 | Gertner et al. |
| 8,845,625 B2 | 9/2014 | Angeley et al. |
| 8,950,867 B2 | 2/2015 | Macnamara |
| 9,081,426 B2 | 7/2015 | Armstrong |
| 9,141,916 B1 | 9/2015 | Corrado et al. |
| 9,215,293 B2 | 12/2015 | Miller |
| 9,262,680 B2 | 2/2016 | Nakazawa et al. |
| D752,529 S | 3/2016 | Loretan et al. |
| 9,310,559 B2 | 4/2016 | Macnamara |
| 9,348,143 B2 | 5/2016 | Gao et al. |
| D758,367 S | 6/2016 | Natsume |
| D759,657 S | 7/2016 | Kujawski et al. |
| 9,417,452 B2 | 8/2016 | Schowengerdt et al. |
| 9,430,829 B2 | 8/2016 | Madabhushi et al. |
| 9,470,906 B2 | 10/2016 | Kaji et al. |
| 9,547,174 B2 | 1/2017 | Gao et al. |
| 9,665,799 B1 * | 5/2017 | Munteanu ................ G06T 1/20 |
| 9,671,566 B2 | 6/2017 | Abovitz et al. |
| D794,288 S | 8/2017 | Beers et al. |
| 9,740,006 B2 | 8/2017 | Gao |
| 9,791,700 B2 | 10/2017 | Schowengerdt et al. |
| D805,734 S | 12/2017 | Fisher et al. |
| 9,851,563 B2 | 12/2017 | Gao et al. |
| 9,857,591 B2 | 1/2018 | Welch et al. |
| 9,874,749 B2 | 1/2018 | Bradski et al. |
| 10,402,649 B2 * | 9/2019 | Rabinovich .......... G06N 3/0454 |
| 2004/0130680 A1 | 7/2004 | Zhou et al. |
| 2006/0088193 A1 | 4/2006 | Muller et al. |
| 2006/0147094 A1 | 7/2006 | Yoo |
| 2007/0052672 A1 | 3/2007 | Ritter et al. |
| 2007/0140531 A1 | 6/2007 | Hamza |
| 2007/0189742 A1 | 8/2007 | Knaan et al. |
| 2009/0129591 A1 | 5/2009 | Hayes et al. |
| 2009/0141947 A1 | 6/2009 | Kyyko et al. |
| 2009/0163898 A1 | 6/2009 | Gertner et al. |
| 2010/0014718 A1 | 1/2010 | Savvides et al. |
| 2010/0131096 A1 | 5/2010 | Koyano |
| 2010/0208951 A1 | 8/2010 | Williams et al. |
| 2010/0232654 A1 | 9/2010 | Rahmes et al. |
| 2010/0284576 A1 | 11/2010 | Tosa |
| 2011/0182469 A1 * | 7/2011 | Ji ...................... G06K 9/00335 382/103 |
| 2011/0202046 A1 | 8/2011 | Angeley et al. |
| 2012/0127062 A1 | 5/2012 | Bar-Zeev et al. |
| 2012/0163678 A1 | 6/2012 | Du et al. |
| 2012/0164618 A1 | 6/2012 | Kullok et al. |
| 2013/0082922 A1 | 4/2013 | Miller |
| 2013/0125027 A1 | 5/2013 | Abovitz |
| 2013/0159939 A1 | 6/2013 | Krishnamurthi |
| 2014/0071539 A1 | 3/2014 | Gao |
| 2014/0126782 A1 | 5/2014 | Takai et al. |
| 2014/0161325 A1 | 6/2014 | Bergen |
| 2014/0177023 A1 | 6/2014 | Gao et al. |
| 2014/0218468 A1 | 8/2014 | Gao et al. |
| 2014/0270405 A1 | 9/2014 | Derakhshani et al. |
| 2014/0279774 A1 | 9/2014 | Wang et al. |
| 2014/0306866 A1 | 10/2014 | Miller et al. |
| 2014/0380249 A1 | 12/2014 | Fleizach |
| 2015/0103306 A1 | 4/2015 | Kaji et al. |
| 2015/0117760 A1 | 4/2015 | Wang et al. |
| 2015/0125049 A1 | 5/2015 | Taigman et al. |
| 2015/0134583 A1 * | 5/2015 | Tamatsu .................. G06N 3/08 706/25 |
| 2015/0154758 A1 | 6/2015 | Nakazawa et al. |
| 2015/0170002 A1 | 6/2015 | Szegedy et al. |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0268415 A1 | 9/2015 | Schowengerdt et al. |
| 2015/0278642 A1 | 10/2015 | Chertok et al. |
| 2015/0302652 A1 | 10/2015 | Miller et al. |
| 2015/0326570 A1 | 11/2015 | Publicover et al. |
| 2015/0338915 A1 * | 11/2015 | Publicover ............ G06F 21/64 345/633 |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0012292 A1 | 1/2016 | Perna et al. |
| 2016/0012304 A1 | 1/2016 | Mayle et al. |
| 2016/0026253 A1 | 1/2016 | Bradski et al. |
| 2016/0034679 A1 | 2/2016 | Yun et al. |
| 2016/0034811 A1 | 2/2016 | Paulik et al. |
| 2016/0035078 A1 | 2/2016 | Lin et al. |
| 2016/0098844 A1 | 4/2016 | Shaji et al. |
| 2016/0104053 A1 | 4/2016 | Yin et al. |
| 2016/0104056 A1 | 4/2016 | He et al. |
| 2016/0135675 A1 | 5/2016 | Du et al. |
| 2016/0162782 A1 | 6/2016 | Park |
| 2016/0189027 A1 | 6/2016 | Graves et al. |
| 2016/0291327 A1 | 10/2016 | Kim et al. |
| 2016/0299685 A1 | 10/2016 | Zhai et al. |
| 2016/0335795 A1 | 11/2016 | Flynn et al. |
| 2017/0053165 A1 | 2/2017 | Kaehler |
| 2017/0061330 A1 | 3/2017 | Kurata |
| 2017/0061625 A1 | 3/2017 | Estrada et al. |
| 2017/0061688 A1 | 3/2017 | Miller |
| 2017/0161506 A1 | 6/2017 | Gates et al. |
| 2017/0168566 A1 | 6/2017 | Osterhout et al. |
| 2017/0186236 A1 | 6/2017 | Kawamoto |
| 2017/0221176 A1 * | 8/2017 | Munteanu ................ G06T 1/60 |
| 2017/0262737 A1 | 9/2017 | Rabinovich et al. |
| 2017/0308734 A1 | 10/2017 | Chalom et al. |
| 2018/0018451 A1 | 1/2018 | Spizhevoy et al. |
| 2018/0018515 A1 | 1/2018 | Spizhevoy et al. |
| 2018/0053056 A1 * | 2/2018 | Rabinovich ............ G06F 1/163 |
| 2018/0082172 A1 | 3/2018 | Patel et al. |
| 2018/0089834 A1 | 3/2018 | Spizhevoy et al. |
| 2018/0096226 A1 | 4/2018 | Aliabadi et al. |
| 2018/0268220 A1 * | 9/2018 | Lee ..................... G06K 9/00671 |
| 2019/0180499 A1 * | 6/2019 | Caulfield ............. G06T 19/006 |
| 2019/0188895 A1 * | 6/2019 | Miller, IV ............. G06F 3/011 |

FOREIGN PATENT DOCUMENTS

| | | |
|---|---|---|
| WO | WO 2015/164807 | 10/2015 |
| WO | WO 2018/013199 | 1/2018 |
| WO | WO 2018/013200 | 1/2018 |
| WO | WO 2018/039269 | 3/2018 |
| WO | WO 2018/063451 | 4/2018 |
| WO | WO 2018/067603 | 4/2018 |
| WO | WO 2018/093796 | 5/2018 |
| WO | WO 2018/170421 | 9/2018 |

OTHER PUBLICATIONS

Bansal A. et al., "Marr Revisited: 2D-3D Alignment via Surface Normal Prediction", Proceedings of the IEEE Conference on Computer Vision and Pattern Recognition (Jun. 27-30, 2016) Computer Vision Foundation—Open Access Version in 10 pages.

(56) References Cited

OTHER PUBLICATIONS

Belagiannis V. et al., "Recurrent Human Pose Estimation", In Automatic Face & Gesture Recognition; 12th IEEE International Conference—May 2017, arXiv:1605.02914v3; Open Access Version in 8 pages.

Bell S. et al., "Inside-Outside Net: Detecting Objects in Context with Skip Pooling and Recurrent Neural Networks", In *Proceedings of the IEEE Conference on Computer Vision and Pattern Recognition*, Jun. 27-30, 2016; pp. 2874-2883.

Biederman I., "Recognition-by-Components: A Theory of Human Image Understanding", Psychol Rev. (Apr. 1987) 94(2): 115-147.

Bulat A. et al., "Human pose estimation via Convolutional Part Heatmap Regression", *In European Conference on Computer Vision*; Oct. 8, 2016; Springer International Publishing (pp. 717-732).

Carreira J. et al., "Human Pose Estimation with Iterative Error Feedback", In Proceedings of the IEEE Conference on Computer Vision and Pattern Recognition, Jun. 27-30, 2016, pp. 4733-4742.

Chatfield K. et al., "Return of the Devil in the Details: Delving Deep into Convolutional Nets", arXiv preprint arXiv:1405.3531v4; Nov. 5, 2014 in 11 pages.

Choy C. et al., "3D-R2N2: A Unified Approach for Single and Multi-view 3D Object Reconstruction", In *European Conference on Computer Vision*—Springer International Publishing; Oct. 8, 2016 (pp. 628-644).

Collet A. et al., "The MOPED framework: Object Recognition and Pose Estimation for Manipulation", The International Journal of Robotics Research. (Sep. 2011) Sep;30(10):1284-306.

Crivellaro A. et al., "A Novel Representation of Parts for Accurate 3D Object Detection and Tracking in Monocular Images", In *Proceedings of the IEEE International Conference on Computer Vision*; Dec. 7-13, 2015 (pp. 4391-4399).

Dai J. et al., "Instance-aware Semantic Segmentation via Multi-task Network Cascades", In *Proceedings of the IEEE Conference on Computer Vision and Pattern Recognition*; Jun. 27-30, 2016 (pp. 3150-3158).

Detone D. et al., "Deep Image Nomography Estimation", arXiv preprint arXiv:1606.03798. (Jun. 13, 2016) in 6 pages.

Dwibedi et al., "Deep Cuboid Detection: Beyond 2D Bounding Boxes", arXiv preprint arXiv:1611.10010; Nov. 30, 2016 in 11 pages.

Everingham M. et al., "The PASCAL Visual Object Classes (VOC) Challenge", Int J Comput Vis (Jun. 2010) 88(2):303-38.

Fidler S. et al., "3D Object Detection and Viewpoint Estimation with a Deformable 3D Cuboid Model", in *Advances in Neural Information Processing Systems 28 (NIPS)*, Copyright Jan. 2015; F. Pereira et al., [Eds.], pp. 611-619.

Fouhey D. et al., "Data-Driven 3D Primitives for Single Image Understanding", in *Proceedings of the IEEE International Conference on Computer Vision*, Dec. 1-8, 2013; pp. 3392-3399.

Geiger A. et al., "Joint 3D Estimation of Objects and Scene Layout", In *Advances in Neural Information Processing Systems 24*; J. Shawe-Taylor et al., [Eds.]; 25th Annual Conference Dec. 17, 2011 in 9 pages.

Gidaris S. et al., "Object detection via a multi-region & semantic segmentation-aware CNN model", in Proceedings of the IEEE International Conference on Computer Vision; Dec. 7-13, 2015 (pp. 1134-1142).

Girshick R. et al., "Rich feature hierarchies for accurate object detection and semantic segmentation", in *Proceedings of the IEEE Conference on Computer Vision and Pattern Recognition*, Jun. 23-28, 2014 (pp. 580-587).

Girshick R. et al., "Fast R-CNN", in *Proceedings of the IEEE International Conference on Computer Vision*; Dec. 7-13, 2015 (pp. 1440-1448).

Gupta A. et al., "Blocks World Revisited: Image Understanding Using Qualitative Geometry and Mechanics", in *European Conference on Computer Vision*; Sep. 5, 2010; Springer Verlag, in 14 pages.

Gupta A. et al., "From 3D Scene Geometry to Human Workspace", in Computer Vision and Pattern Recognition (CVPR); IEEE Conference on Jun. 20, 2011 (pp. 1961-1968).

Gupta S. et al., "Aligning 3D Models to RGB-D Images of Cluttered Scenes", in Proceedings of the IEEE Conference on Computer Vision and Pattern Recognition, Jun. 7-12, 2015 (pp. 4731-4740).

Gupta S. et al., "Inferring 3D Object Pose in RGB-D Images", arXiv preprint arXiv:1502.04652.(Feb. 16, 2015) in 13 pages.

Han S. et al., "Deep Compression: Compressing Deep Neural Networks with Pruning, Trained Quantization and Huffman Coding", arXiv preprint arXiv:1510.00149v5 of Feb. 15, 2016 in 14 pages.

Hartley R. et al., [Eds.] *Multiple View Geometry in Computer Vision*, 2nd Edition; Cambridge University Press, copyright 2003; Table of Contents in 7 pages.

He K. et al., "Spatial Pyramid Pooling in Deep Convolutional Networks for Visual Recognition", in *European Conference on Computer Vision*; arXiv preprint arXiv:1406.4729v2; Aug. 29, 2014 in 14 pages.

Hedau V. et al., "Recovering Free Space of Indoor Scenes from a Single Image", in *Computer Vision and Pattern Recognition* (CVPR), IEEE Conference Jun. 16-21, 2012 (pp. 2807-2814).

Hejrati M. et al., "Categorizing Cubes: Revisiting Pose Normalization", in *Applications of Computer Vision* (WACV), 2016 IEEE Winter Conference, Mar. 7, 2016 in 9 pages.

Hijazi, S. et al., "Using Convolutional Neural Networks for Image Recognition", Tech Rep. (Sep. 2015) available online URL: http://ip.cadence.com/uploads/901/cnn-wp-pdf, in 12 pages.

Hoiem D. et al., "Representations and Techniques for 3D Object Recognition and Scene Interpretation", Synthesis Lectures on Artificial Intelligence and Machine Learning, Aug. 2011, vol. 5, No. 5, pp. 1-169; Abstract in 2 pages.

Hsiao E. et al., "Making specific features less discriminative to improve point-based 3D object recognition", in *Computer Vision and Pattern Recognition* (CVPR), IEEE Conference on Jun. 13, 2010 (pp. 2653-2660).

Iandola F. et al., "SqueezeNet: AlexNet-level accuracy with 50x fewer parameters and <1MB model size", arXiv preprint arXiv:1602.07360v1. Feb. 24, 2016 in 5 pages.

Jia Z. et al., "3D-Based Reasoning with Blocks, Support, and Stability", in *Proceedings of the IEEE Conference on Computer Vision and Pattern Recognition*; Jun. 23-28, 2013 in 8 pages.

Jia Y. et al., "Caffe: Convolutional Architecture for Fast Feature Embedding", in *Proceedings of the 22nd ACM International Conference on Multimedia*; arXiv preprint arXiv:1408.5093v1 of Jun. 20, 2014 in 4 pages.

Jiang H. et al., "A Linear Approach to Matching Cubopids in RGBD Images", in *Proceedings of the IEEE Conference on Computer Vision and Pattern Recognition*. Jun. 23-28, 2013 (pp. 2171-2178).

Kar A. et al., "Category-specific object reconstruction from a single image", in *Proceedings of the IEEE Conference on Computer Vision and Pattern Recognition*. Jun. 7-12, 2015 (pp. 1966-1974).

Krizhevsky A. et al., "ImageNet Classification with Deep Convolutional Neural Networks", *Advances in Neural Information Processing Systems*. Copyright 2012; Pereira et al. [Eds.]; pp. 1097-1105.

Lee D. et al., "Geometric Reasoning for Single Image Structure Recovery", in IEEE Conference Proceedings in Computer Vision and Pattern Recognition (CVPR) Jun. 20, 2009; (pp. 2136-2143).

Lim J. et al., "FPM: Fine pose Parts-based Model with 3D CAD models", in *European Conference on Computer Vision; Springer Publishing*, Sep. 6, 2014 (pp. 478-493).

Liu W. et al., "SSD: Single Shot MultiBox Detector", in *European Conference on Computer Vision. Springer Publishing*; Oct. 8, 2016; arXiv preprint arXiv:1512.02325v5; (Dec. 29, 2016) in 17 pages.

Rastegari M. et al., "XNOR-Net: ImageNet Classification Using Binary Convolutional Neural Networks", in *European Conference on Computer Vision. Springer Publishing*, Oct. 8, 2016 (pp. 525-542); arXiv preprint arXiv:1603.05279v4; (Aug. 2, 2016) in 17 pages.

Redmon J. et al., "You Only Look Once: Unified, Real-Time Object Detection", in *Proceedings of the IEEE Conference on Computer Vision and Pattern Recognition*. Jun. 27-30, 2016 (pp. 779-788).

(56) References Cited

OTHER PUBLICATIONS

Ren S. et al., "Faster R-CNN: Towards real-time object detection with region proposal networks", in Advances in neural information processing systems; arXiv preprint arXiv:1506.01497v3; Jan. 6, 2016 in 14 pages.
Roberts L. et al., "Machine Perception of Three-Dimensional Solids", Doctorial Thesis MIT; Jun. 1963 in 82 pages.
Savarese S. et al., "3D generic object categorization, localization and pose estimation", in *Computer Vision*, IEEE 11th International Conference; Oct. 14, 2007; (pp. 1-8).
Shao T. et al., "Imagining the Unseen: Stability-based Cuboid Arrangements for Scene Understanding", ACM Transactions on Graphics. (Nov. 2014) 33(6) in 11 pages.
Simonyan K. et al., "Very deep convolutional networks for large-scale image recognition", arXiv preprint arXiv:1409.1556v6. (Apr. 10, 2015) in 14 pages.
Song S. et al., "Sliding Shapes for 3D Object Detection in Depth Images", in *European Conference on Computer Vision*, (Sep. 6, 2014) Springer Publishing (pp. 634-651).
Song S. et al., "Deep Sliding Shapes for Amodal 3D Object Detection in RGB-D Images", in *Proceedings of the IEEE Conference on Computer Vision and Pattern Recognition*. Jun. 27-30, 2016 (pp. 808-816).
Su H. et al., "Render for CNN: Viewpoint Estimation in Images Using CNNs Trained with Rendered 3D Model Views", in *Proceedings of the IEEE International Conference on Computer Vision*, Dec. 7-13, 2015 (pp. 2686-2694).
Tulsiani S. et al., "Viewpoints and Keypoints", in *Proceedings of the IEEE Conference on Computer Vision and Pattern Recognition*; Jun. 7-12, 2015 (pp. 1510-1519).
Wilczkowiak M. et al., "Using Geometric Constraints Through Parallelepipeds for Calibration and 3D Modelling", IEEE Transactions on Pattern Analysis and Machine Intelligence. (Feb. 2005) 27(2): 54 pages.
Wu J. et al., "Single Image 3D Interpreter Network", in *European Conference on Computer Vision*. Springer Publishing, Oct. 8, 2016 (pp. 365-382).
Xiang Y. et al., "Data-Driven 3D Voxel Patterns for Object Category Recognition", in *Proceedings of the IEEE Conference on Computer Vision and Pattern Recognition*, Jun. 7-12, 2015 (pp. 1903-1911).
Xiao J. et al., "Localizing 3D cuboids in single-view images", in Advances in Neural Information Processing Systems 25. F. Pereira et al. [Eds.] Dec. 2012 (pp. 746-754).
Yang Y. et al., "Articulated human detection with flexible mixtures of parts", IEEE Transactions on Pattern Analysis and Machine Intelligence. Dec. 2013; 35(12):2878-90.
Zheng Y. et al., "Interactive Images: Cuboid Proxies for Smart Image Manipulation", ACM Trans Graph. (Jul. 2012) 31(4):99-109.
Azizpour, et al.: "From Generic to Specific Deep Representations for Visual Recognition," ResearchGate, Jun. 22, 2014: https://www.researchgate.net/publication/263352539 retrieved on Apr. 27, 2016.
Badrinarayanan et al., "SegNet: A Deep Convolutional Encoder-Decoder Architecture for Image Segmentation", TPAMI, vol. 39, No. 12, Dec. 2017.
Chen et al., "Semantic Image Segmentation With Deep Convolutional Nets and Fully Connected CRFs," In ICLR, arXiv:1412.7062v3 [cs.CV] Apr. 9, 2015.
Coughlan et al., "The Manhattan World Assumption: Regularities in scene statistics which enable bayesian inference," In NIPS, 2000.
Dasgupta et al., "Delay: Robust Spatial Layout Estimation for Cluttered Indoor Scenes," In CVPR, 2016.
Del Pero et al., "Bayesian geometric modeling of indoor scenes," In CVPR, 2012.
Del Pero et al., "Understanding bayesian rooms using composite 3d object models," In CVPR, 2013.
Gupta et al., "Perceptual Organization and Recognition of Indoor Scenes from RGB-D Images," In CVPR, 2013.
He et al., "Deep Residual Learning for Image Recognition," In CVPR, 2016.
Hedau et al., "Recovering the Spatial Layout of Cluttered Rooms," In ICCV, 2009.
Hochreiter et al., "Long Short-Term Memory," Neural computation, 9, 1735-1780, 1997.
"Inductive transfer", Wikipedia printed Apr. 27, 2016, in 3 pages, URL: https://en.wikipedia.org/w/indes.php?title=Inductive_transfer&oldid=71711292.
Izadinia et al., "IM2CAD," arXiv preprint arXiv:1608.05137, 2016.
Lee et al., "Deeply-Supervised Nets," In AISTATS, San Diego, CA 2015, JMLR: W&CP vol. 38.
Lee et al., "Estimating Spatial Layout of Rooms using Volumetric Reasoning about Objects and Surfaces," In NIPS, 2010.
Lee et al., "Generalizing Pooling Functions in Convolutional Neural Networks: Mixed, Gated, and Tree," In AISTATS, Gadiz, Spain, JMLR: W&CP vol. 51, 2016.
Lee et al., "Recursive Recurrent Nets with Attention Modeling for OCR in the Wild," In CVPR, 2016.
Liang et al., "Recurrent Convolutional Neural Network for Object Recognition," In CVPR, 2015.
Liu et al., "Rent3d: Floor-Plan Priors for Monocular Layout Estimation," In CVPR, 2015.
Mallya et al., "Learning Informative Edge Maps for Indoor Scene Layout Prediction," In ICCV, 2015.
Mirowski et al., "Learning to Navigate in Complex Environments," In ICLR, 2017.
Nair et al., "Rectified Linear Units Improve Restricted Boltzmann Machines," In ICML, Haifa, Israel 2010.
Newell et al., "Stacked Hourglass Networks for Human Pose Estimation," In ECCV, ArXiv:1603.06937v2 [cs.CV] 2016.
Noh et al., "Learning Deconvolution Network for Semantic Segmentation," In ICCV, 2015.
Oberweger et al., "Training a Feedback Loop for Hand Pose Estimation," In ICCV, 2015.
Peng et al., "A Recurrent Encoder-Decoder Network for Sequential Face Alignment," In ECCV, arXiv:1608.05477v2 [cS.Cv] 2016.
Pfister et al., "Flowing Convnets for Human Pose Estimation in Videos," In ICCV, 2015.
Ramalingam et al., "Manhattan Junction Catalogue for Spatial Reasoning of Indoor Scenes," In CVPR, 2013.
Ren et al., "A Coarse-to-Fine Indoor Layout Estimation (CFILE) Method," In ACCV, arXiv:1607.00598v1 [cs.CV] 2016.
Russell et al., "Labelme: a database and web-based tool for image annotation," IJCV, vol. 77, Issue 1-3, pp. 157-173, May 2008.
Schwing et al., "Efficient Structured Prediction for 3D Indoor Scene Understanding," In CVPR, 2012.
Shi et al., "Convolutional LSTM Network: A Machine Learning Approach for Precipitation Nowcasting," In NIPS, 2015.
Song et al., "Sun RGB-D: A RGB-D Scene Understanding Benchmark Suite," In CVPR, 2015.
Szegedy et al., "Going Deeper with Convolutions," In CVPR, 2015, in 9 pages.
Tompson et al., "Joint Training of a Convolutional Network and a Graphical Model for Human Pose Estimation," In NIPS, 2014.
Tu et al., "Auto-context and Its Application to High-level Vision Tasks," In CVPR, 2008. 978-1-4244-2243-2/08, IEEE.
Xiao et al., "Reconstructing the Worlds Museums," IJCV, 2014.
Xiao et al., "Sun database: Large-scale scene recognition from abbey to zoo," In CVPR, 2010 IEEE Conference on 2010, 3485-3492.
Yosinski, et al.: "How transferable are features in deep neural networks?" In Advances in Neural Information Processing Systems 27 (NIPS '14), NIPS Foundation, 2014.
Zhang et al., "Estimating the 3D Layout of Indoor Scenes and its Clutter from Depth Sensors," In ICCV, 2013.
Zhang et al., Large-scale Scene Understanding Challenge: Room Layout Estimation, 2016.
Zhao et al., "Scene Parsing by integrating Function, Geometry and Appearance, Models," In CVPR, 2013.
Zheng et al., "Conditional Random Fields as Recurrent Neural Networks," In CVPR, 2015.
"Camera Calibration and 3D Reconstruction", OpenCV, retrieved May 5, 2016, from <http://docs.opencv.org/2.4/modules/calib3d/doc/camera_calibration_and_3d_reconstruction.html> in 53 pages.

(56) References Cited

OTHER PUBLICATIONS

"Camera calibration with OpenCV", OpenCV, retrieved May 5, 2016, in 7 pages. URL: http://docs.opencv.org/3.1.0/d4/d94/tutorial_camera_calibration.html#gsc.tab=0.
"Camera calibration with OpenCV", OpenCV, retrieved May 5, 2016, in 12 pages. URL: http://docs.opencv.org/2.4/doc/tutorials/calib3d/camera_calibration/camera_calibration.html.
"Convolution", Wikipedia, accessed Oct. 1, 2017, in 17 pages. URL: https://en.wikipedia.org/wiki/Convolution.
"Deep Learning", Wikipedia, printed Oct. 3, 2017, in 23 pages. URL: https://en.wikipedia.org/wiki/Deep_learning.
"Feature Extraction Using Convolution", Ufldl, printed Sep. 1, 2016, in 3 pages. URL:http://deeplearning.stanford.edu/wiki/index.php/Feature_extraction_using_convolution.
"Machine Learning", Wikepedia, printed Oct. 3, 2017, in 14 pages. URL: https://en.wikipedia.org/wiki/Machine_learning.
"Transfer Function Layers", GitHub, Dec. 1, 2015, in 13 pages; accessed URL: http://github.com/torch/nn/blob/master/doc/transfer.md.
Adegoke et al., "Iris Segmentation: A Survey", Int J Mod Engineer Res. (IJMER) (Aug. 2013) 3(4): 1885-1889.
Anthony, S., "MIT releases open-source software that reveals invisible motion and detail in video", Extreme Tech, Feb. 28, 2013, as archived Aug. 4, 2017, in 5 pages.
Arevalo J. et al., "Convolutional neural networks for mammography mass lesion classification", in *Engineering in Medicine and Biology Society* (EMBC); 37th Annual International Conference IEEE, Aug. 25-29, 2015, pp. 797-800.
Badrinarayanan et al., "SegNet: A Deep Convolutional Encoder-Decoder Architecture for Image Segmentation", IEEE (Dec. 8, 2015); arXiv: eprint arXiv:1511.00561v2 in 14 pages.
Bouget, J., "Camera Calibration Toolbox for Matlab" Cal-Tech, Dec. 2, 2013, in 5 pages. URL: https://www.vision.caltech.edu/bouguetj/calib_doc/index.html#parameters.
Chen X. et al., "3D Object Proposals for Accurate Object Class Detection", in *Advances in Neural Information Processing Systems*, (2015) Retrieved from <http://papers.nips.cc/paper/5644-3d-object-proposals-for-accurate-object-class-detection.pdf>; 11 pages.
Dai J. et al., "R-FCN: Object Detection via Region-based Fully Convolutional Networks", in *Advances in neural information processing systems*; (Jun. 21, 2016) Retrieved from <https://arxiv.org/pdf/1605.06409.pdf in 11 pages.
Daugman, J. et al., "Epigenetic randomness, complexity and singularity of human iris patterns", Proceedings of Royal Society: Biological Sciences, vol. 268, Aug. 22, 2001, in 4 pages.
Daugman, J., "New Methods in Iris Recognition," IEEE Transactions on Systems, Man, and Cybernetics—Part B: Cybernetics, vol. 37, No. 5, Oct. 2007, in 9 pages.
Daugman, J., "How Iris Recognition Works", IEEE Transactions on Circuits and Systems for Video Technology, vol. 14, No. 1, Jan. 2004, in 10 pages.
Daugman, J., "Probing the Uniqueness and Randomness of IrisCodes: Results From 200 Billion Iris Pair Comparisons," Proceedings of the IEEE, vol. 94, No. 11, Nov. 2006, in 9 pages.
Farabet, C. et al., "Hardware Accelerated Convolutional Neural Networks for Synthetic Vision Systems", Proceedings of the 2010 IEEE International Symposium (May 30-Jun. 2, 2010) Circuits and Systems (ISCAS), pp. 257-260.
Gupta S. et al., "Learning Rich Features from RGB-D Images for Object Detection and Segmentation", in *European Conference on Computer Vision*; (Jul. 22, 2014); Retrieved from <https://arxiv.org/pdf/1407.5736.pdf> in 16 pages.
Hansen, D. et al., "In the Eye of the Beholder: A Survey of Models for Eyes and Gaze", IEEE Transactions on Pattern Analysis and Machine Intelligence, vol. 32, No. 3, Mar. 2010, in 23 pages.
He et al., "Delving Deep into Rectifiers: Surpassing Human-level Performance on ImageNet Classification", arXiv: eprint arXiv:1502.01852v1, Feb. 6, 2015 in 11 pages.

Hoffer et al., "Deep Metric Learning Using Triplet Network", International Workshop on Similarity-Based Pattern Recognition [ICLR]; Nov. 25, 2015; [online] retrieved from the internet <https://arxiv.org/abs/1412.6622>; pp. 84-92.
Huang et al., "Sign Language Recognition Using 3D Convolutional Neural Networks", University of Science and Technology of China, 2015 IEEE International Conference on Multimedia and Expo. Jun. 29-Jul. 3, 2015, in 6 pages.
Ioffe S. et al., "Batch Normalization: Accelerating Deep Network Training by Reducing Internal Covariate Shift", International Conference on Machine Learning (Jun. 2015); arXiv: eprint arXiv:1502.03167v3, Mar. 2, 2015 in 11 pages.
Jarrett et al., "What is the Best Multi-Stage Architecture for Object Recognition?", In Computer Vision IEEE 12th International Conference Sep. 29-Oct. 2, 2009, pp. 2146-2153.
Ji, H. et al., "3D Convolutional Neural Networks for Human Action Recognition", IEEE Transactions on Pattern Analysis and Machine Intelligence, vol. 35:1, Jan. 2013, in 11 pages.
Jillela et al., "An Evaluation of Iris Segmentation Algorithms in Challenging Periocular Images", Handbook of Iris Recognition, Springer Verlag, Heidelberg (2012); 28 pages.
Lavin, A. et al.: "Fast Algorithms for Convolutional Neural Networks", Proceedings of the IEEE Conference on Computer Vision and Pattern Recognition, arXiv: eprint arXiv:1509.09308v2; Nov. 10, 2016 in 9 pages.
Liu et al., "ParseNet: Looking Wider to See Better", arXiv eprint arXiv:1506.04579v1; Jun. 15, 2015 in 9 pages.
Long et al., "Fully Convolutional Networks for Semantic Segmentation", Proceedings of the IEEE Conference on Computer Vision and Pattern Recognition (Jun. 7-12, 2015) in 10 pages.
Pavlakos G. et al., "6-dof object pose from semantic keypoints", in arXiv preprint Mar. 14, 2017; Retrieved from <http://www.cis.upenn.edu/~kostas/mypub.dir/pavlakos17icra.pdf> in 9 pages.
Ren, J. et al.: "On Vectorization of Deep Convolutional Neural Networks for Vision Tasks," Association for the Advancement of Artificial Intelligence; arXiv: eprint arXiv:1501.07338v1, Jan. 29, 2015 in 8 pages.
Rubinstein, M., "Eulerian Video Magnification", YouTube, published May 23, 2012, as archived Sep. 6, 2017, in 13 pages (with video transcription). URL: https://web.archive.org/web/20170906180503/https://www.youtube.com/watch?v=ONZcjs1Pjmk&feature=youtu.be.
Saxena A., "Convolutional Neural Networks (CNNS): An Illustrated Explanation", Jun. 29, 2016 in 16 pages; Retrieved from <http://xrds.acm.org/blog/2016/06/convolutional-neural-networks-cnns-illustrated-explanation/>.
Schroff et al., "FaceNet: A unified embedding for Face Recognition and Clustering", arXiv eprint arXiv:1503.03832v3, Jun. 17, 2015 in 10 pages.
Shafiee et al., "ISAAC: A Convolutional Neural Network Accelerator with In-Situ Analog Arithmetic in Crossbars", ACM Sigarch Comp. Architect News (Jun. 2016) 44(3):14-26.
Szegedy et al., "Going deeper with convolutions", The IEEE Conference on Computer Vision and Pattern Recognition; arXiv, eprint arXiv:1409.4842v1, Sep. 17, 2014 in 12 pages.
Szegedy et al., "Rethinking the Inception Architecture for Computer Vision", arXiv eprint arXIV:1512.00567v3, Dec. 12, 2015 in 10 pages.
Villanueva, A. et al., "A Novel Gaze Estimation System with One Calibration Point", IEEE Transactions on Systems, Man, and Cybernetics—Part B:Cybernetics, vol. 38:4, Aug. 2008, in 16 pages.
International Search Report and Written Opinion for PCT Application No. PCT/US2015/29679, dated Jul. 6, 2017.
International Search Report and Written Opinion for PCT Application No. PCT/US17/29699, dated Sep. 8, 2017.
International Search Report and Written Opinion for PCT Application No. PCT/US2017/034482, dated Aug. 2, 2017.
International Search Report and Written Opinion for PCT Application No. PCT/US2017/048068, dated Nov. 20, 2017.
International Search Report and Written Opinion for PCT Application No. PCT/US2017/054987, dated Dec. 12, 2017.
International Search Report and Written Opinion for PCT Application No. PCT/US2017/061618, dated Jan. 17, 2018.

\* cited by examiner

Iteration 1    Iteration 2

DEEP LEARNING SYSTEM FOR CUBOID DETECTION

CROSS-REFERENCE TO RELATED APPLICATIONS

This application claims the benefit of priority to U.S. Patent Application No. 62/422,547, filed Nov. 15, 2016, entitled "DEEP CUBOID DETECTION: BEYOND 2D BOUNDING BOXES," the content of which is hereby incorporated by reference herein in its entirety.

BACKGROUND

Field

The present disclosure relates generally to systems and methods for three-dimensional object detection in images and more particularly to deep machine learning systems for detecting cuboids in images.

Description of the Related Art

A deep neural network (DNN) is a computation machine learning method. DNNs belong to a class of artificial neural networks (NN). With NNs, a computational graph is constructed which imitates the features of a biological neural network. The biological neural network includes features salient for computation and responsible for many of the capabilities of a biological system that may otherwise be difficult to capture through other methods. In some implementations, such networks are arranged into a sequential layered structure in which connections are unidirectional. For example, outputs of artificial neurons of a particular layer can be connected to inputs of artificial neurons of a subsequent layer. A DNN can be a NN with a large number of layers (e.g., 10s, 100s, or more layers).

Different NNs are different from one another in different perspectives. For example, the topologies or architectures (e.g., the number of layers and how the layers are interconnected) and the weights of different NNs can be different. A weight can be approximately analogous to the synaptic strength of a neural connection in a biological system. Weights affect the strength of effect propagated from one layer to another. The output of an artificial neuron can be a nonlinear function of the weighted sum of its inputs. The weights of a NN can be the weights that appear in these summations.

SUMMARY

Building a three-dimensional (3D) representation of the world from a single monocular image is an important challenge in computer vision. The present disclosure provides examples of systems and methods for detection of 3D cuboids (e.g., box-like objects) and localization of keypoints in images. In one aspect, a deep cuboid detector can be used for simultaneous cuboid detection and keypoint localization in images. The deep cuboid detector can include a plurality of convolutional layers and non-convolutional layers of a trained convolutional neural network for determining a convolutional feature map from an input image. A region proposal network of the deep cuboid detector can determine a bounding box surrounding a cuboid in the image using the convolutional feature map. The pooling layer and regressor layers of the deep cuboid detector can implement iterative feature pooling for determining a refined bounding box and a parameterized representation of the cuboid.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 1B shows that one cuboid inside the monocular image is detected and its vertices localized (shown as eight black circles that are connected).

Figure 1:
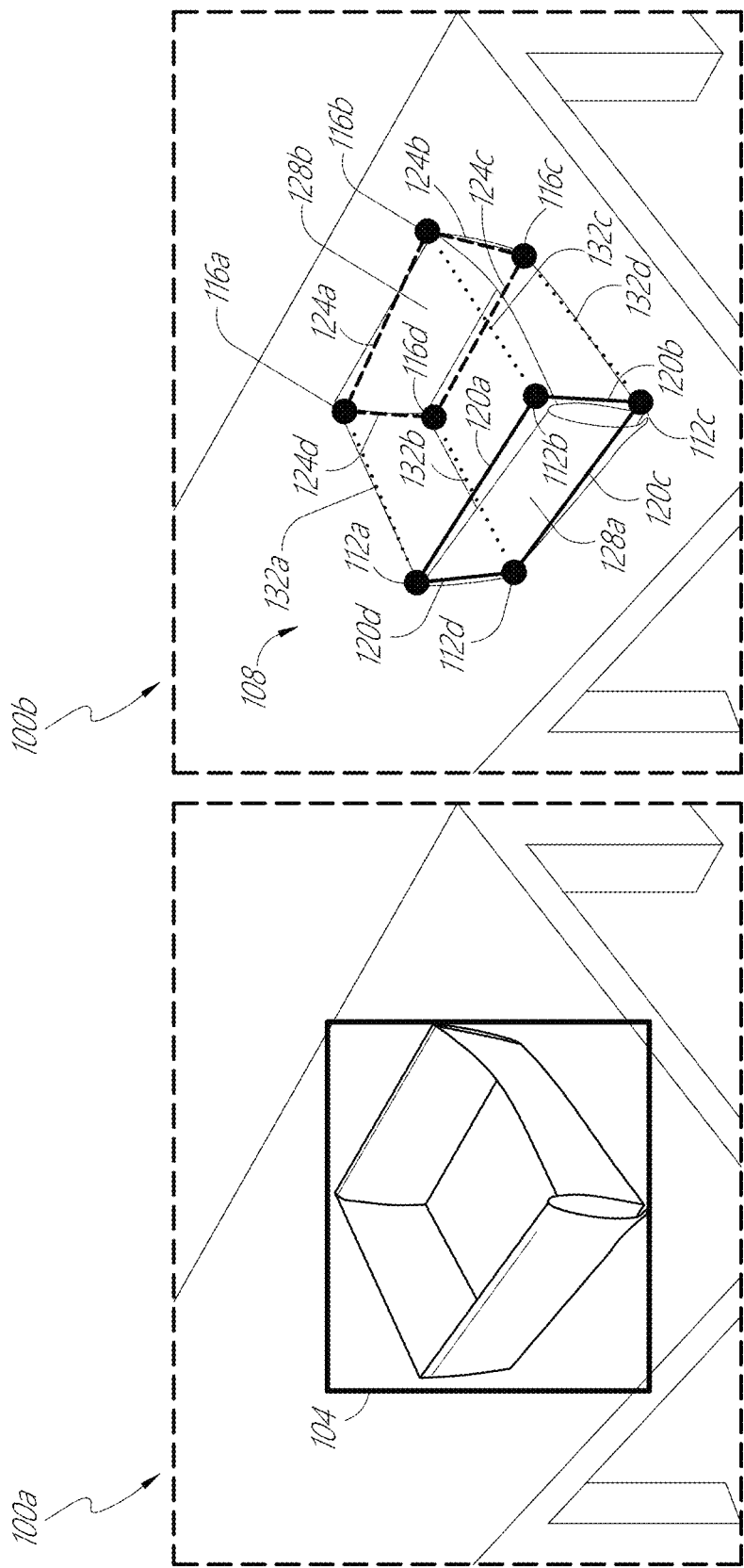
FIG. 1A is an example monocular image illustrating two-dimensional (2D) object detection with a bounding box overlaid around an object detected.
FIG. 1B is an example monocular image illustrating three-dimensional (3D) cuboid detection with a representation of the cuboid overlaid on the object detected.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Models representing data relationships and patterns, such as functions, algorithms, systems, and the like, may accept input, and produce output that corresponds to the input in some way. For example, a model may be implemented as a machine learning method such as a convolutional neural network (CNN) or a deep neural network (DNN). Deep learning is part of a broader family of machine learning methods based on the idea of learning data representations as opposed to task specific algorithms and shows a great deal of promise in solving audio-visual computational problems useful for augmented reality, mixed reality, virtual reality, and machines intelligence. In machine learning, a convolutional neural network (CNN, or ConvNet) can include a class of deep, feed-forward artificial neural networks, and CNNs have successfully been applied to analyzing visual imagery. Machine learning methods include a family of methods that can enable robust and accurate solutions to a wide variety of problems, including eye image segmentation and eye tracking.

Disclosed herein are examples of a cuboid detector which processes an input image of a scene and localizes at least one cuboid in the image. For example, a cuboid detector (such as a deep cuboid detector) can process a consumer-quality Red-Green-Blue (RGB) image of a cluttered scene and localize some or all three-dimensional (3D) cuboids in the image. A cuboid can comprise a boxy or a box-like object and can include a polyhedron (which may be convex) with, e.g., 4, 5, 6, 7, 8, 10, 12, or more faces. For example, cuboids can include pyramids, cubes, prisms, parallelepipeds, etc. Cuboids are not limited to such polyhedral shapes from geometry and can include box-like structures such as, e.g., appliances (e.g., television sets, computer monitors, toasters, washing machines, refrigerators), furniture (e.g., sofas, chairs, beds, cribs, tables, book cases, cabinets), vehicles (e.g., automobiles, buses), etc. As further described below, cuboids may be identified in terms of their faces, vertices, edges, or presence within a bounding box.

In some embodiments, a cuboid can comprise a geometric shape characterized as a tuple of N parameters. The parameters may be geometric in nature, like the radius of a sphere or the length, width, and height of the cuboid. A more general way to parameterize any geometric primitive can be to represent it as a collection of points on the surface of the primitive. If a random point on the surface of the primitive is chosen, the random point might not be localizable from a computer-vision point of view. It may be advantageous for the set of parameterization points to be geometrically informative and visually discriminative. For example, in the case of cuboids, the set of parameterization points may be the cuboid's vertices (which may be referred to sometimes herein as corners or keypoints).

In some embodiments, a cuboid is represented as a tuple of eight vertices, where each vertex can be denoted by its coordinates (e.g., Cartesian x,y coordinates) in the image. In such a representation, a cuboid is represented by 16 parameters: the two coordinates of each of the eight vertices. Not all 16 parameters might be needed in some cases, for example, as will be discussed below alternate cuboid representations may not include some vertices (e.g., use only six vertices) and determine the other vertices using vanishing points.

Contrary to other approaches which fit a 3D model from low-level cues like corners, edges, and vanishing points, the cuboid detector disclosed herein can be an end-to-end deep learning system that detects cuboids across many semantic categories (e.g., ovens, shipping boxes, and furniture). In some implementations, the cuboid detector can localize a cuboid with a two-dimensional (2D) bounding box, and simultaneously localize the cuboid's keypoints (e.g., vertices or corners), effectively producing a 3D interpretation or representation of a box-like object. The cuboid detector can refine keypoints by pooling convolutional features iteratively, improving the accuracy of the keypoints detected. Based on an end-to-end deep learning framework, an advantage of some implementations of the cuboid detector is that there is little or no need to design custom low-level detectors for line segments, vanishing points, junctions, etc.

The cuboid detector can include a plurality of convolutional layers and non-convolutional layers of a convolutional neural network, a region proposal network (RPN), and a plurality of pooling and regressor layers. The RPN can generate object proposals in an image. The plurality convolutional layers and non-convolutional layers can generate a convolutional feature map of an input image. A convolutional layer of the CNN can include a kernel stack of kernels. A kernel of a convolutional layer, when applied to its input, can produce a resulting output activation map showing the response to that particular learned kernel. The resulting output activation map can then be processed by another layer of the CNN. Non-convolutional layers of the CNN can include, for example, a normalization layer, a rectified linear layer, or a pooling layer.

The region proposal network (RPN), which can be convolutional neural network or a deep neural network, can determine a 2D bounding box around a cuboid in the image from the convolutional feature map. The 2D bounding box can represent a region of interest (RoI) on the image which includes a cuboid at an image location. The plurality of pooling and regressor layers can include, for example, a pooling layer and two or more fully-connected layers (such as 3, 5, 10, or more layers). Based on the initial 2D bounding box, the plurality of cuboid pooling and regressor layers can, iteratively, determine a refined 2D bounding box and the cuboid's keypoints.

The cuboid detector can be trained in an end-to-end fashion and can be suitable for real-time applications in augmented reality (AR), mixed reality (MR), or robotics in some implementations. As described below, a wearable mixed reality display device (e.g., the wearable display system 1000 described with reference to FIG. 10) can include a processor programmed to perform cuboid detection on images acquired by an outward-facing camera of the display device. Some or all parameters of the cuboid detector can be learned in a process referred to as training. For example, a machine learning model can be trained using training data that includes input data and the correct or preferred output of the model for the corresponding input data. The machine learning model can repeatedly process the input data, and the parameters (e.g., the weight values) of the machine learning model can be modified in what amounts to a trial-and-error process until the model produces (or "converges" on) the correct or preferred output. For example, the modification of weight values may be performed through a process referred to as "back propagation." Back propagation includes determining the difference between the expected model output and the obtained model output, and then determining how to modify the values of some or all parameters of the model to reduce the difference between the expected model output and the obtained model output.

Example Comparison of Object Detection and Cuboid Detection

Building a 3D representation of the world from a single monocular image is an important problem in computer vision. In some applications, objects having explicit 3D models are localized with their poses estimated. But without such 3D models, a person or a computer system (e.g., the wearable display system 1000 described with reference to FIG. 10) may still need to reason about its surrounding in terms of simple combinations of geometric shapes like cuboids, cylinders, and spheres. Such primitives, sometimes referred to as geons, can be easy for humans to reason about. Humans can effortlessly make coarse estimates about the pose of these simple geometric primitives and even compare geometric parameters like length, radius or area across disparate instances. While many objects are composed of multiple geometric primitives, a large number of real objects can be well approximated by as little as one primitive.

For example, a common shape is the box. Many everyday objects can geometrically be classified as a box (e.g., shipping boxes, cabinets, washing machines, dice, microwaves, desktop computers). Boxes (which are examples of cuboids) span a diverse set of everyday object instances, and humans can easily fit imaginary cuboids to these objects and localizing their vertices and faces. People can also compare the dimensions of different box-like objects even though they are not aware of the exact dimensions of the box-like objects or even if the objects are not perfect cuboids. Disclosed herein are systems and methods that implement a cuboid detector for detecting class agnostic geometric entities, such as cuboids. Class agnostic means that different classes of a geometric entity are not differentiated. For example, a cuboid detector may not differentiate between different classes of a cuboid, such as a shipping box, a microwave oven, or a cabinet. All of these box-like objects can be represented with the same simplified concept, a cuboid.

An embodiment of a cuboid detector can be used for 3D object detection as follows: fit a 3D bounding box to objects in an image (e.g., an RGB image or an RGB-Depth (RGB-D) image), detect 3D keypoints in the image, or perform 3D model to 2D image alignment. Because an image might contain multiple cuboids as well as lots of clutter (e.g., non-cuboidal objects), the cuboid detector can first determine a shortlist of regions of interest (RoIs) that correspond to cuboids. In addition to the 2D bounding box enclosing each cuboid, the cuboid detector can determine the location of all eight vertices.

Deep learning has revolutionized image recognition in the past few years. Many state-of-the-art methods in object detection today are built on top of deep networks that have been trained for the task for image classification. A cuboid detector can be a deep cuboid detector implementing one or more deep learning methods. The cuboid detector can have high accuracy and run in real-time using the hardware of a mobile device (e.g., the wearable display system 1000 descried with reference to FIG. 10).

FIG. 1A is an example monocular image 100*a* illustrating two-dimensional (2D) object detection with a bounding box 104 overlaid around an object detected. FIG. 1B is an example monocular image 100*b* illustrating three-dimensional (3D) cuboid detection with a representation 108 of the cuboid overlaid on the object detected. FIG. 1B shows that one cuboid 108 inside the monocular image 100 is detected and its vertices localized. The eight vertices are shown as four black circles 112*a*-112*d* that are connected by four edges 120*a*-120*d* (represented as dotted lines) and four additional black circles 116*a*-116*d* connected by four edges 124*a*-124*d* (represented as solid lines). Four of the vertices 112*a*-112*d* represent one face 128*a* of the cuboid, and the other four of the vertices 116*a*-116*d* represent another face 128*b* of the cuboid. The two faces 128*a*, 128*b* of the cuboid 108 are connected by four edges 132*a*-132*d* (represented as dashed lines) through the vertices 112*a*-112*d*, 116*a*-116*d*. The cuboid detector can detect box-like objects in a scene. Unlike object detection, the cuboid detector can determine more than a bounding box of an object. In addition, the cuboid detector can localize the vertices of the cuboids (e.g., compare FIG. 1A with FIG. 1B). In some embodiments, the cuboid detector can be class agnostic. For example, the cuboid detector does not care about the class of the cuboids being detected. For example, the cuboid detector can distinguish two classes of objects: a cuboid and a non-cuboid cuboid. The cuboid detector can perform 3D cuboid detection by determining all cuboids inside a monocular image and localize their vertices. The cuboid detector can be trained in an end-to-end fashion. The cuboid detector can run in real-time and perform cuboid detection with RGB images of cluttered scenes captured using a consumer-grade camera as input. A wearable display device (e.g., the wearable display system 1000 descried with reference to FIG. 10) can implement the cuboid detector and use information about the detected cuboids to generate or update a world map indicative of the environment surrounding the user of the wearable display device.

A cuboid is a geometric object that can be parameterized, and a cuboid detector (e.g., a deep cuboid detector) can determine parameters of a cuboid in a scene. One approach to detect a cuboid is to detect the edges and try to fit the model of a cuboid to these edges. Hence, robust edge selection may be a useful aspect of the system. However, this becomes challenging when there are misleading textures on cuboidal surfaces, for example, if edges and corners are occluded or the scene contains considerable background clutter. It can be challenging to classify whether a given line belongs to a given cuboid with purely local features. The cuboid detector can learn to detect cuboids in images using a data-driven approach. The cuboid detector can assign a single label (e.g., "cuboid") to box-like objects in a scene, even though the label is spread over many categories like houses, washing machines, ballot boxes, desks, cars, television sets, etc. The cuboid detector can include a CNN that is able to successfully learn features that help a system implementing it (e.g., the wearable display system 1000 descried with reference to FIG. 10) identify cuboids in different scenes.

In some embodiments, a cuboid detector can implement a deep learning model that jointly performs cuboid detection and keypoint localization. For example, a cuboid detector can include a deep neural network that jointly performs cuboid detection and keypoint localization. The cuboid detector can exceed the accuracy of the detection and localization accuracy performed by other methods. In some implementations, the cuboid detector can first detect the object of interest and then make coarse or initial predictions regarding the location of its vertices. The cuboid can utilize the coarse or initial predictions as an attention mechanism, performing refinement of vertices by only looking at regions with high probability of being a cuboid. In some embodiments, the cuboid detector can implement an iterative feature pooling mechanism to improve accuracy. The cuboid detector can combine cuboid-related losses and or implement alternate parametrizations to improve accuracy.

Example Cuboid Network Architecture and Loss Function

Figure 2:
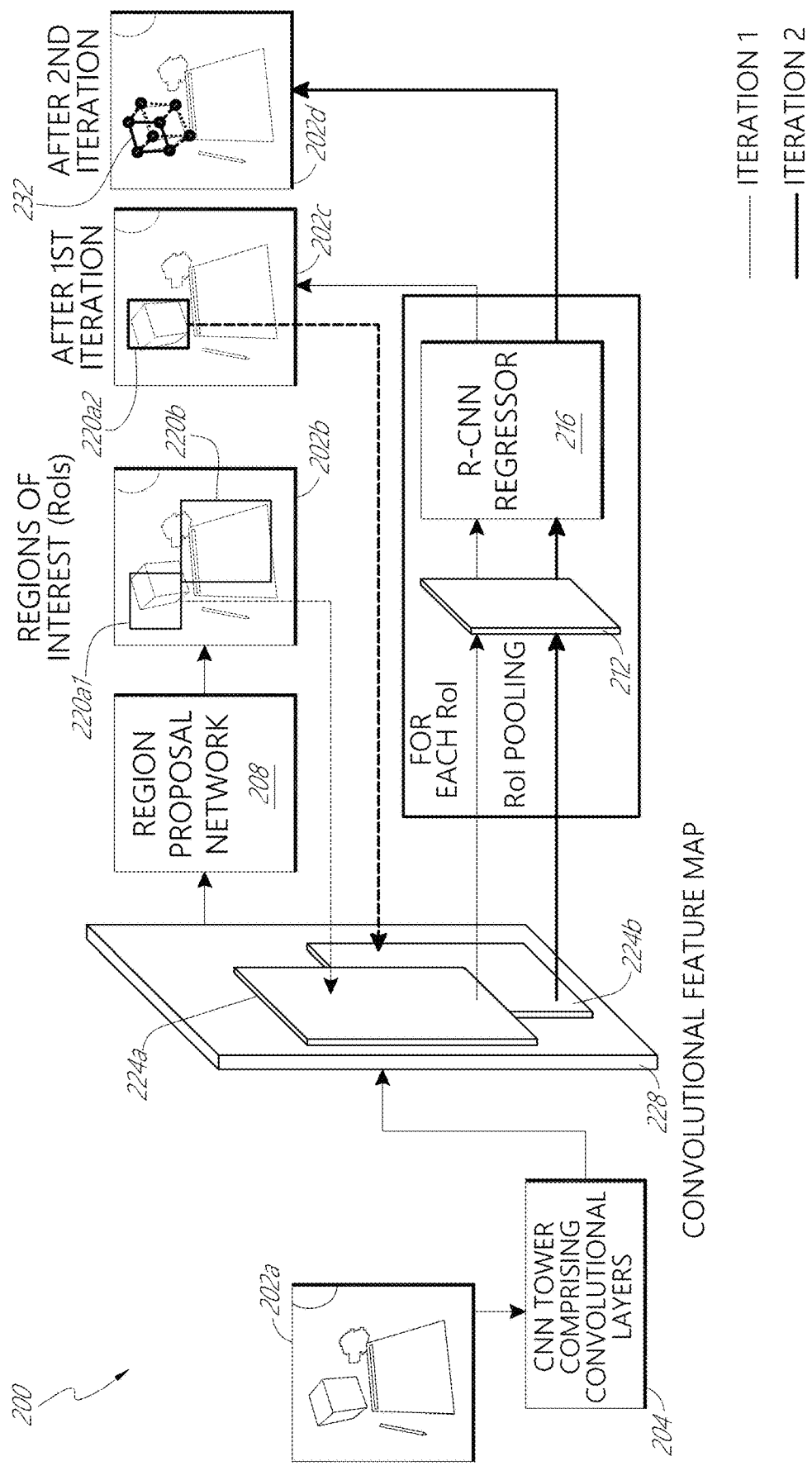
FIG. 2 depicts an example architecture of a cuboid detector.

FIG. 2 depicts an example architecture of a cuboid detector. The cuboid detector 200 can include one or more of the following components: a convolutional layers 204 (also referred to herein as a CNN tower), a Region Proposal Network (RPN) 208, at least one pooling layer 212, or one or more fully connected layers 216 (e.g., a regional CNN (R-CNN) regressor (or classifier)). The pooling layer 212 and the fully connected layers 216 can implement iterative feature pooling, which refines cuboid keypoint locations. The R-CNN can be a Faster R-CNN.

The cuboid detector 200 can implement a deep cuboid detection pipeline. The first action of the deep cuboid detection pipeline can be determining Regions of Interest (RoIs) 220*a*1, 220*b*, in an image 202*a* where a cuboid might be present. The Region Proposal Network (RPN) 200 can be trained to output such RoIs 220*a*1, 220*b* as illustrated in the image 202*b*. Then, regions 224*a* with features corresponding to each RoI 220*a*1, 220*b* can be pooled, using one or more pooling layers 212, from a convolutional feature map 228

(e.g., the fifth convolutional feature map, conv5, in VGG-M from the Visual Geometry Group at Oxford University). These pooled features can be passed through two fully connected layers 216. In some implementations, instead of just producing a 2D bounding box, the cuboid detector 200 can output the normalized offsets of the vertices from the center of the RoI 220a1, 220b. The cuboid detector 200 can refine the predictions by performing iterative feature pooling. The dashed lines in FIG. 2 show the regions 224a, 224b of the convolutional feature map 228, corresponding to the RoI 220a1 in the image 202b and a refined RoI 220a2 in the image 202c, from which features can be pooled. The two fully connected layers 216 can process the region 224b of the convolutional feature map 228 corresponding to the refined RoI 220a2 to determine a further refined RoI and/or a representation of a cuboid 232 in the image 202d.

The CNN Tower 204 can be the pre-trained fully convolutional part of ConvNets, such as VGG and ResNets. The convolutional feature map 228 refers to the output of the last layer of the CNN Tower 204. For example, the convolutional feature map 228 can be the output of the fifth convolutional layer, such as conv5 in VGG16 from the Visual Geometry Group at Oxford University with size m×n×512).

The RPN 208 can be a fully convolutional network that maps every cell in the convolutional feature map 228 to a distribution over K multi-scale anchor-boxes, bounding box offsets, and objectness scores. The RPN can have two associated loss functions: a log loss function for objectness and a smooth L1 loss function for bounding box regression. The RPN 208 can, for example, use 512 3×3 filters, then 18 1×1 filters for objectness and 36 1×1 filters for bounding box offsets.

The RoI pooling layer 212 can use, for example, max pooling to convert the features inside any valid region of interest 220a1, 220a2, 220b into a small fixed-size feature map (or a submap of the convolutional feature map 228). For example, for conv5 of size m×n x×512, the pooling layer 212 can produce an output of size 7×7×512, independent of the input regions aspect ratio and scale. In some embodiments, spatial pyramid matching can be implemented.

Figure 3:
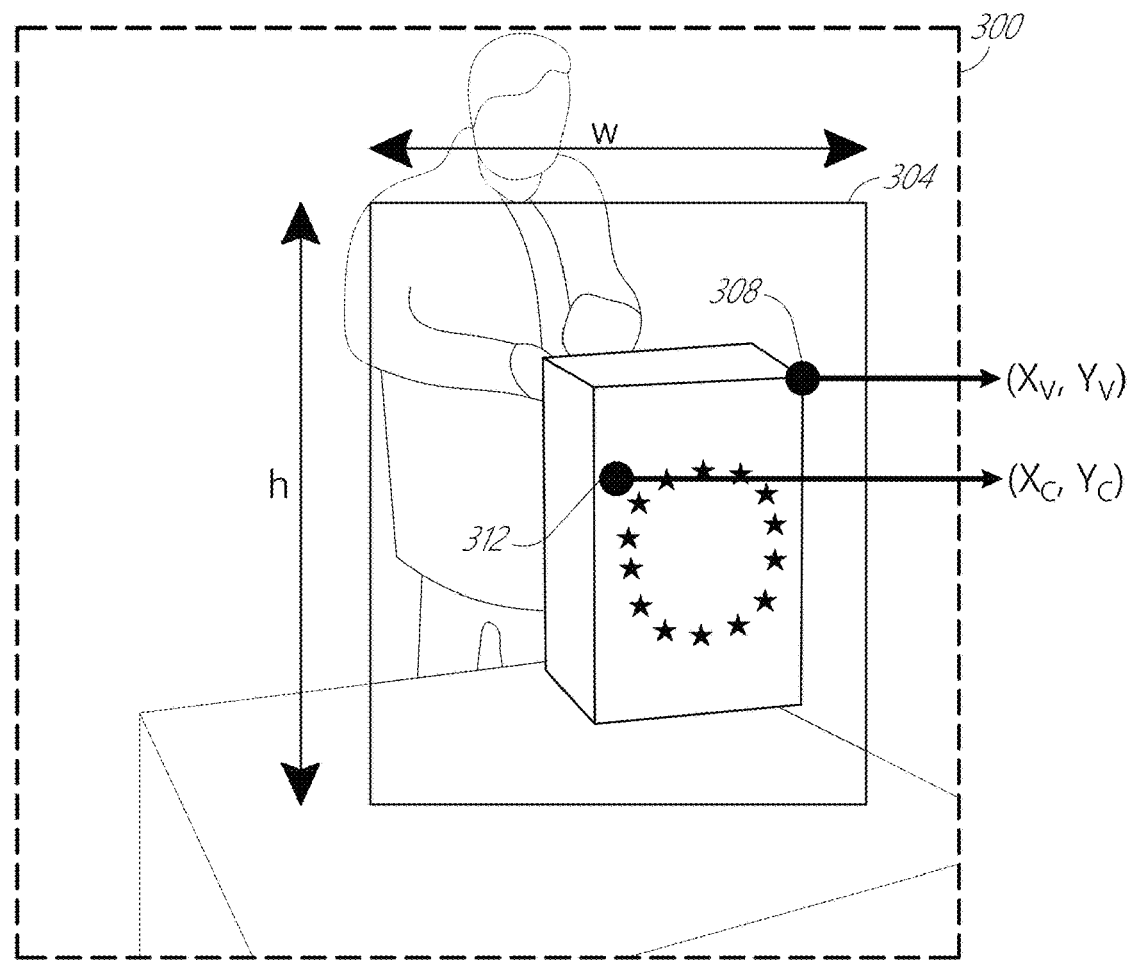
FIG. 3 is an example image illustrating region of interest (RoI) normalized coordinates.

The fully connected layers 216 (e.g., a R-CNN regressor) can then be applied to each fixed-size feature vector, outputting a cuboidness score, bounding box offsets (four numbers), and eight cuboid keypoint locations (16 numbers). The bounding box regression values ($\Delta x$, $\Delta y$, $\Delta w$, $\Delta h$) can be used to fit the initial object proposal tightly around the object. The keypoint locations can be encoded as offsets from the center of the RoI and can be normalized by the proposal width/height as shown in FIG. 3. FIG. 3 illustrates RoI-normalized coordinates of vertices represented as offsets from the center of an RoI 304 in an image 300 and normalized by the region's width w and height h with ($x_v$, $y_v$) being a keypoint 308 and ($x_c$, $y_c$) being the center 312 of the RoI. Example ground truth targets for each keypoint are shown in Equations [1] and [2]:

$$t_x = \frac{x_v - x_c}{w}, \text{ and} \quad \text{Equation [1]}$$

$$t_y = \frac{x_v - x_c}{w}. \quad \text{Equation [2]}$$

Referring to FIG. 2, the R-CNN can include two fully connected layers 216 (e.g., 4096 neurons each) and can have three associated loss functions: a log loss function for cuboidness and smooth L1 loss functions for both bounding box and vertex regression.

When viewed in unison, the RoI pooling layer 212 and R-CNN layers act as a refinement mechanism, mapping an input box to an improved one, given the feature map. The cuboid detector 200 can apply the last part of the network multiple times (e.g., 2, 3, 4, or more times), referred to herein as iterative feature pooling.

The loss functions used in the RPN 208 can include $L_{anchor-cls}$, the log loss over two classes (e.g., cuboid vs. not cuboid) and $L_{anchor-reg}$, the Smooth L1 loss of the bounding box regression values for each anchor box. The loss functions for the R-CNN can include $L_{ROI-cls}$, the log loss over two classes (e.g., cuboid vs. not cuboid), $L_{ROI-reg}$, the Smooth L1 loss of the bounding box regression values for the RoI, and $L_{ROI-corner}$, the Smooth L1 loss over the RoI's predicted keypoint locations. The last term can be referred to as the corner or vertex regression loss. The complete loss function can be a weighted sum of the above mentioned losses and can be written as shown in Equation [3]. The loss weight $\lambda_i$ can be different in different implementations, such as 0.1, 0.5, 1, 2, 5, 10, or more.

$$L = \lambda_1 L_{anchor-cls} + \lambda_2 L_{anchor-reg} + \lambda_3 L_{ROI-cls} + \lambda_4 L_{ROI-reg} + \lambda_5 L_{ROI-corner}. \quad \text{Equation [3]}$$

Example Performance

To determine its performance, an embodiment of the cuboid detector 200 was implemented using Caffe and built on top of an implementation of Faster R-CNN. To determine the performance, the VGG-M or VGG16 networks that have been pre-trained for the task of image classification on ImageNet were used. VGG-M is a smaller model with 7 layers while VGG16 contains 16 layers. All models were fine-tuned for 50K iterations using stochastic gradient descent (SGD) with a learning rate of 0.001, which was reduced by a factor of 10 after 30K iterations. Additional parameters used include a momentum of 0.9, weight decay of 0.0005, and dropout of 0.5. Instead of stage-wise training. Components of the cuboid detector 200 were jointly optimized with the values of all the loss weights as one (e.g., $\lambda_i=1$ in Equation [3]).

Data.

The SUN Primitive dataset (a comprehensive collection of annotated images covering a large variety of environmental scenes, places and the objects within; available from https://groups.csail.mit.edu/vision/SUN/) was used to train the deep cuboid detector 200. The dataset consists of 3516 images and is a mix of in-door scenes with lots of clutter, internet images containing only a single cuboid, and outdoor images of buildings that also look like cuboids. Both cuboid bounding boxes and cuboid keypoints have ground-truth annotations. This dataset includes 1269 annotated cuboids in 785 images. The rest of the images are negatives, e.g., they do not contain any cuboids. The dataset was split to create a training set of 3000 images and their horizontally flipped versions and a test set with 516 test images.

The cuboid detector 200 was evaluated on two tasks: cuboid bounding box detection and cuboid keypoint localization. For detection, a bounding box was correct if the intersection over union (IoU) overlap was greater than 0.5.2. Detections were sorted by confidence (e.g., the network's classifier softmax output) with the mean Average Precision (AP) as well as the entire Precision-Recall curve reported. For keypoint localization, the Probability of Correct Keypoint (PCK) and Average Precision of Keypoint (APK) metrics were used to determine the cuboid detector's performance. PCK and APK are used in the human pose estimation literature to measure the performance of systems predicting the location of human body parts like head, wrist, etc. PCK measures the fraction of annotated instances that are correct when all the ground truth boxes are given as input to the system. A predicted keypoint was considered correct if its normalized distance from the annotation was less than a threshold (a). APK, on the other hand, takes both detection confidence and keypoint localization into consideration. A normalized distance, $\alpha$, of 0.1 was used, meaning that a predicted keypoint was considered to be correct if it lied within a number of pixels of the ground truth annotation of the keypoint shown in Equation [4]. The normalized distance, $\alpha$, can be different in different implementations, such as 0.01, 0.2, 0.3, 0.5, 0.9, or more.

$$1.1 * \max(height, width) \quad \text{Equation [4]}$$

Figure 4A:
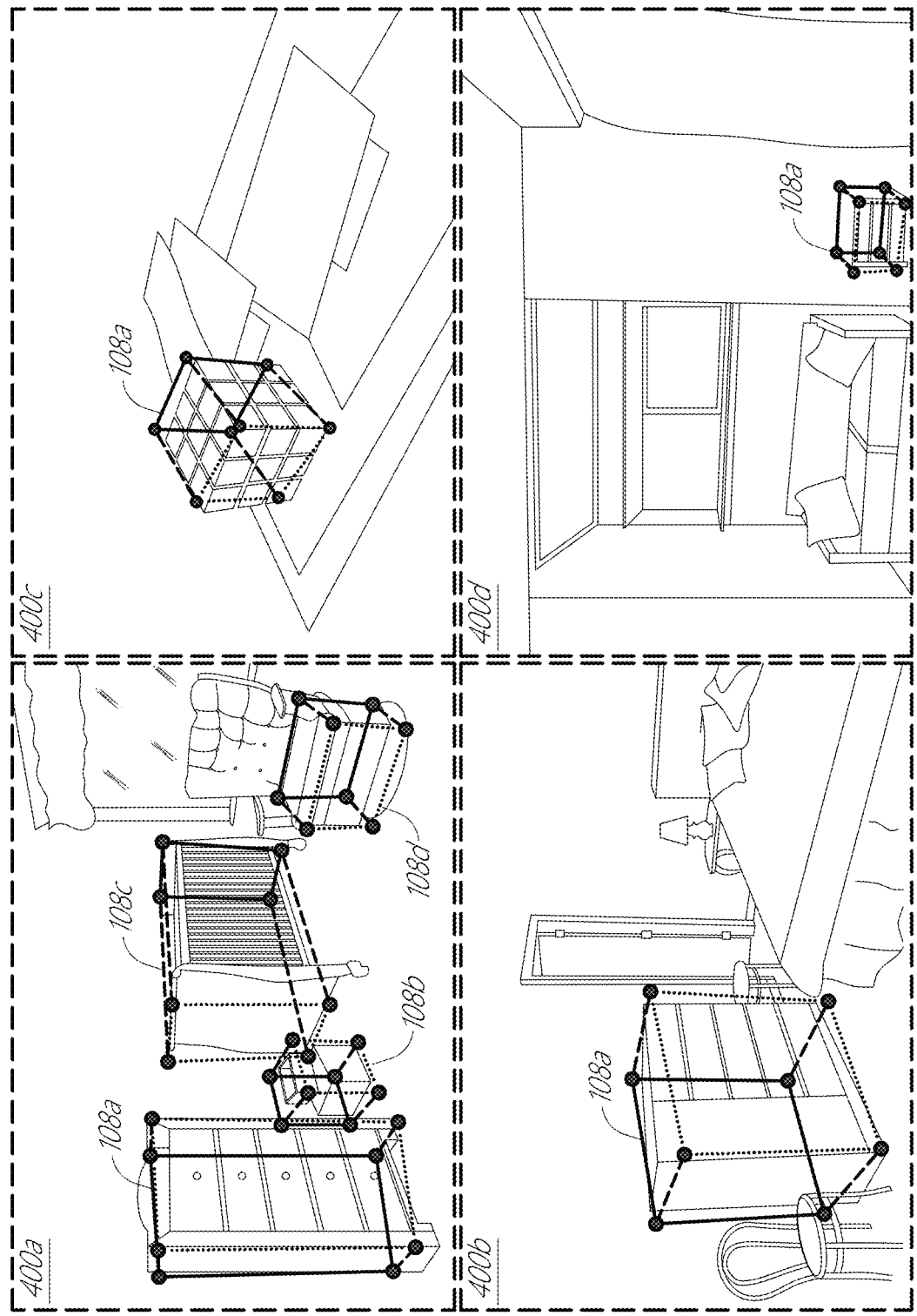
FIGS. 4A-4G show images illustrating example cuboid detection and keypoint localization. One or more cuboids have been detected in each image with keypoint of each cuboid localized, shown as white connected circles.
Figure 4B:
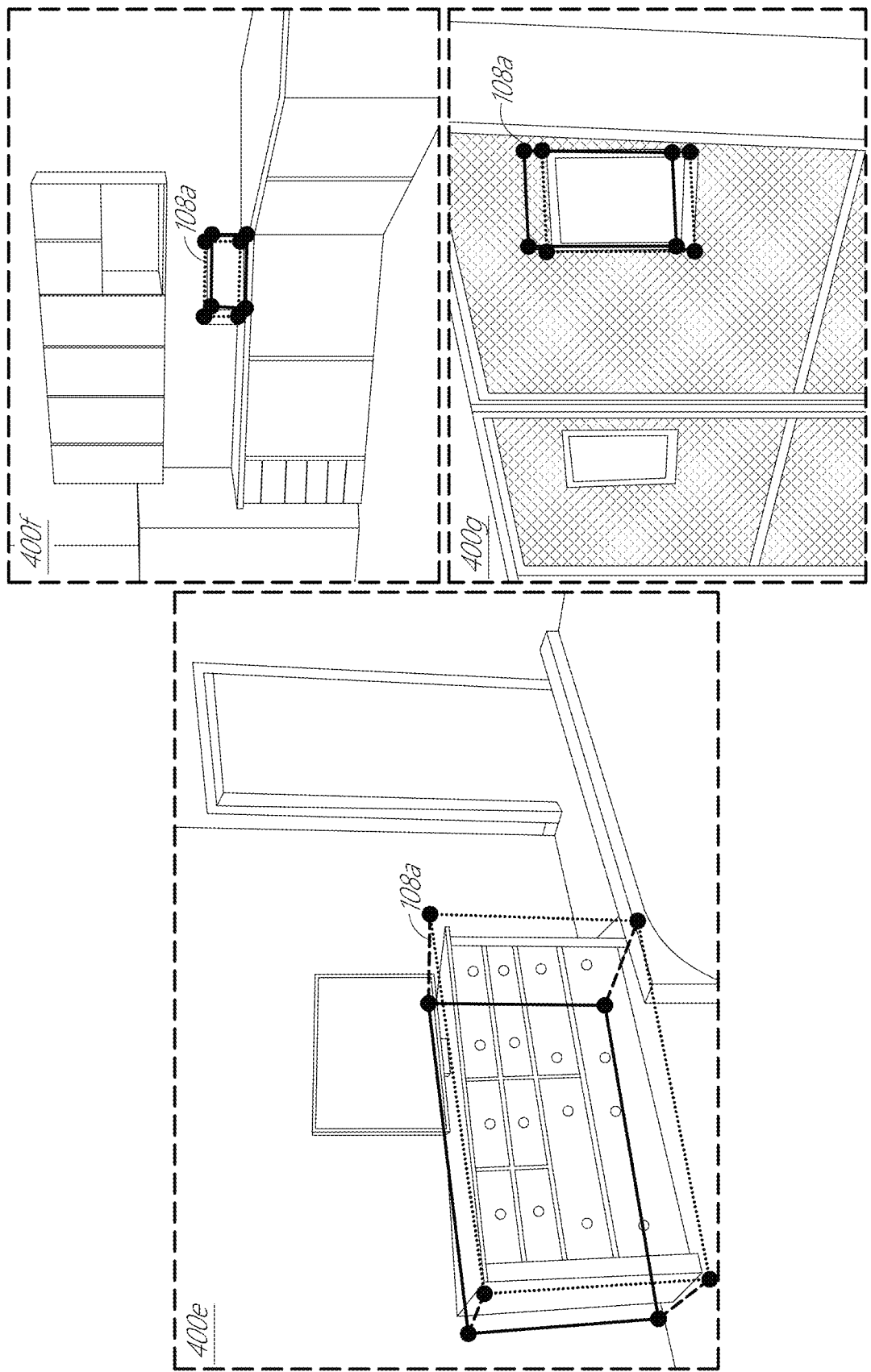
Figure 4C:
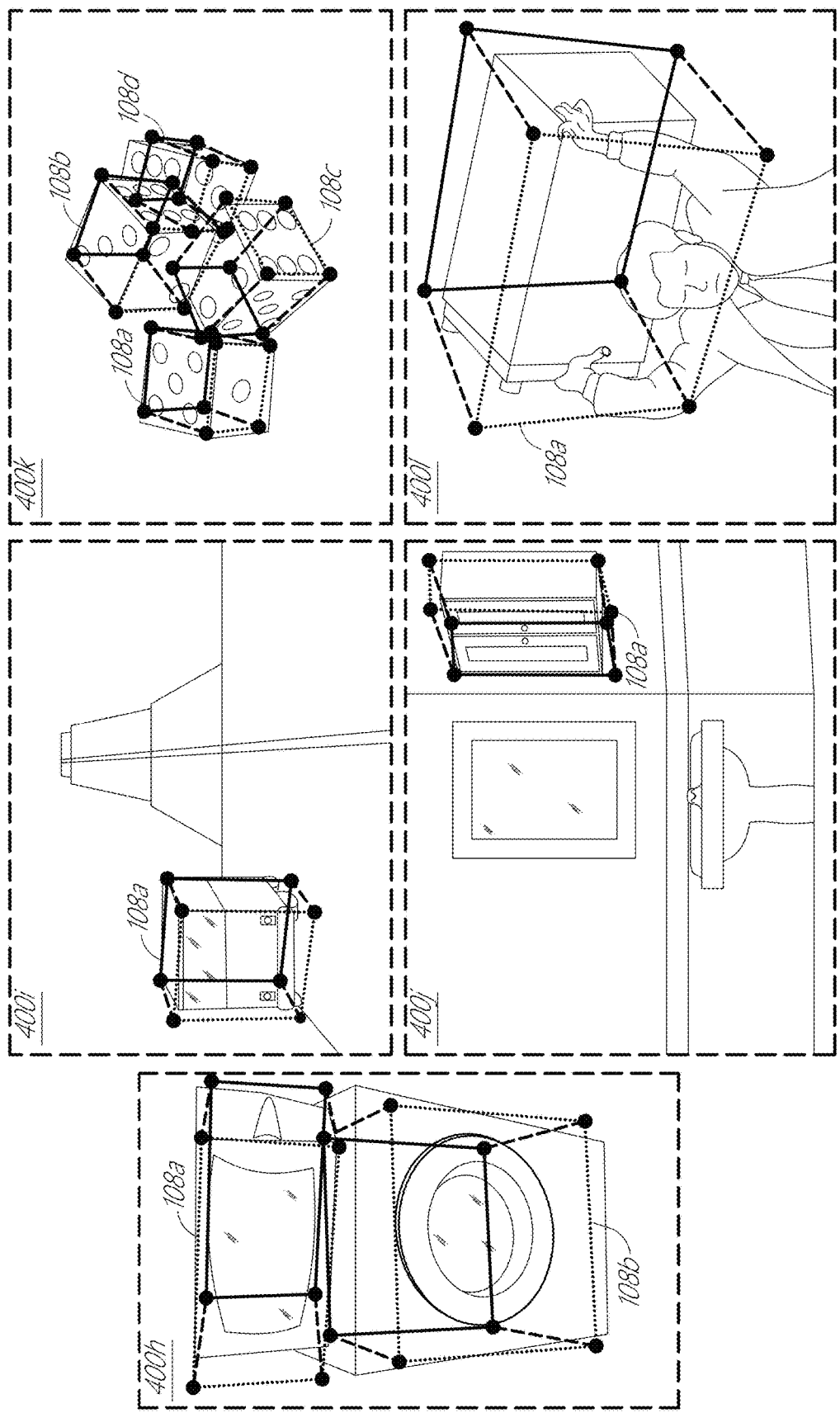
Figure 4D:
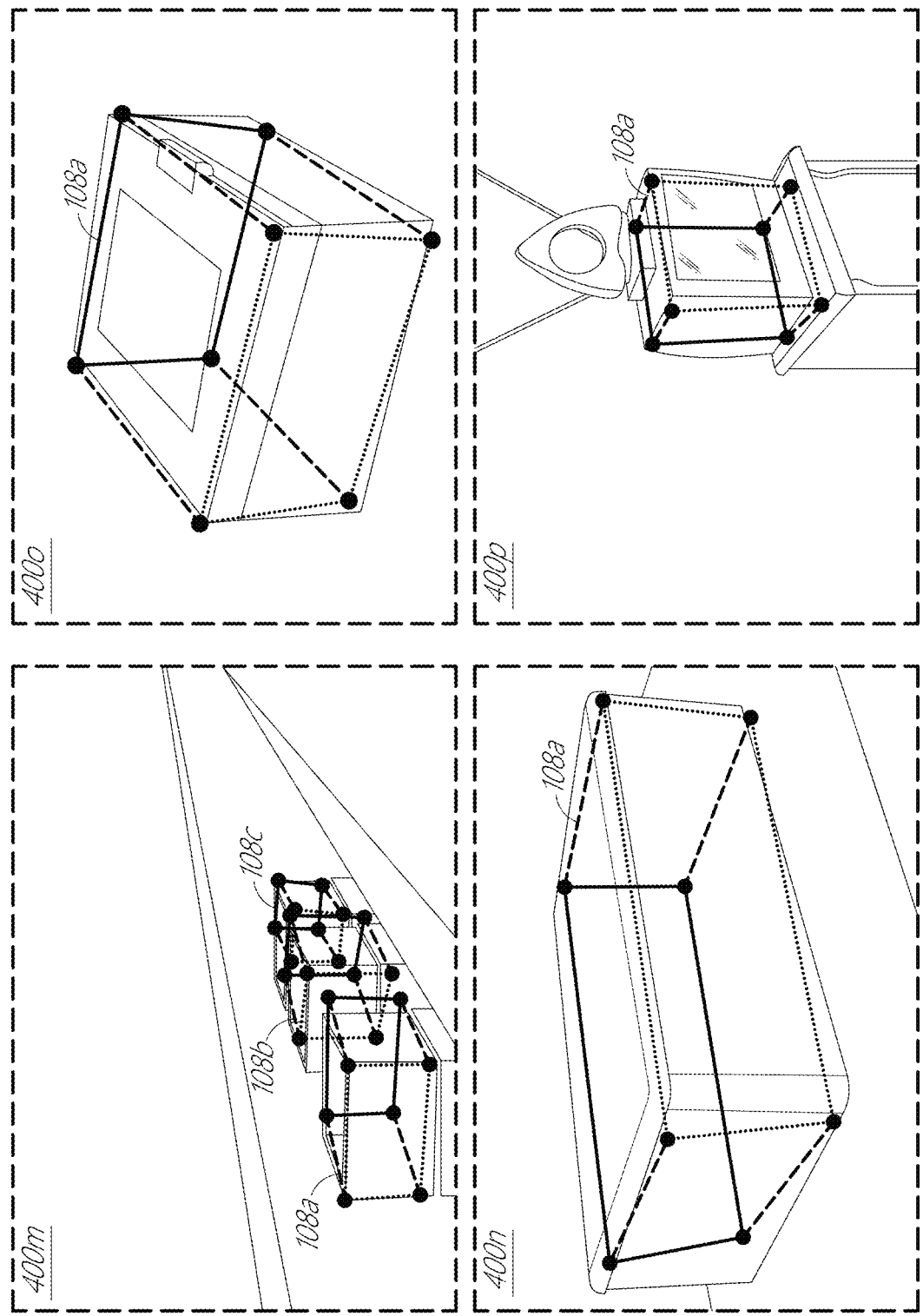
Figure 4E:
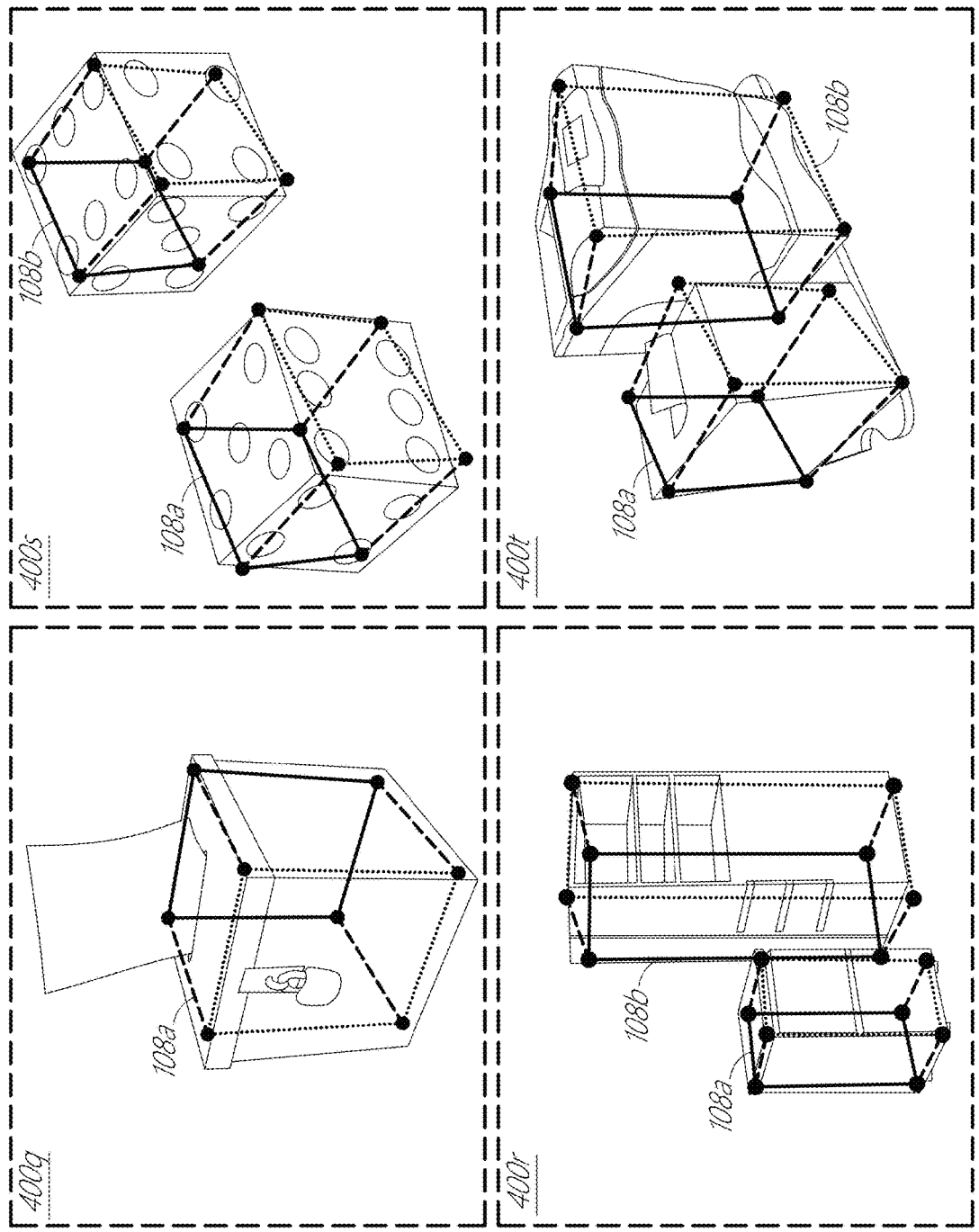
Figure 4F:
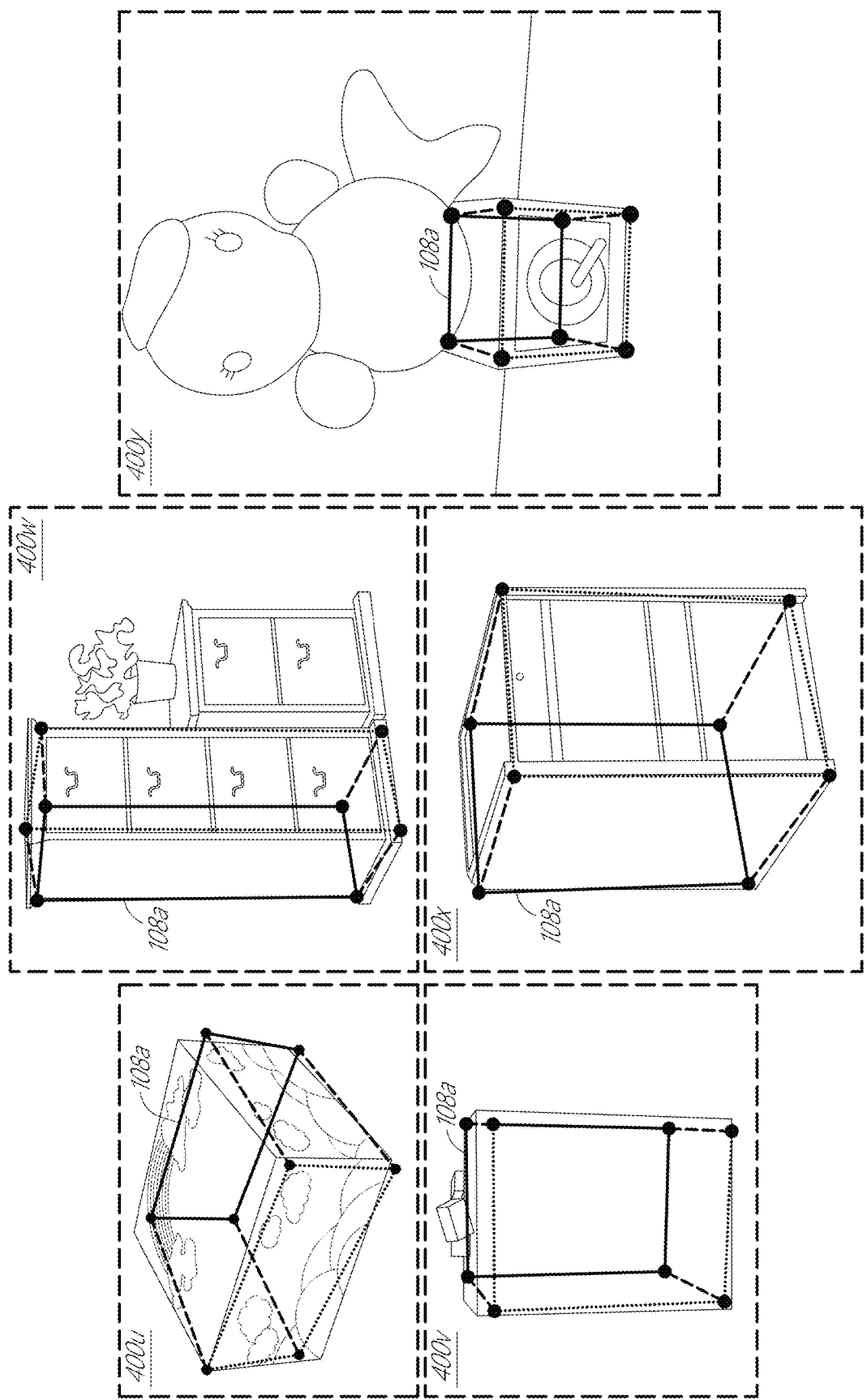

See FIGS. 7A-7F for these metrics reported on the SUN Primitive test set and samples of cuboid detections and vertices localization in monocular images 400a-400y, 404a-404e illustrated in FIGS. 4A-4G. For example, FIG. 4A shows a monocular image 400a with example representations 108a-108d of four cuboids each represented as eight vertices. As another example, FIG. 4A shows another monocular image 400b with an example representation 108a of a cuboid with four vertices representing one face of the cuboid connected by four edges (shown as solid lines) and four vertices representing another face of the cuboid connected by another four edges (shown as dotted lines). The eight vertices on these two faces of the representation 108a of the cuboid are connected by four edges (shown as dashed lines).

Figure 4G:
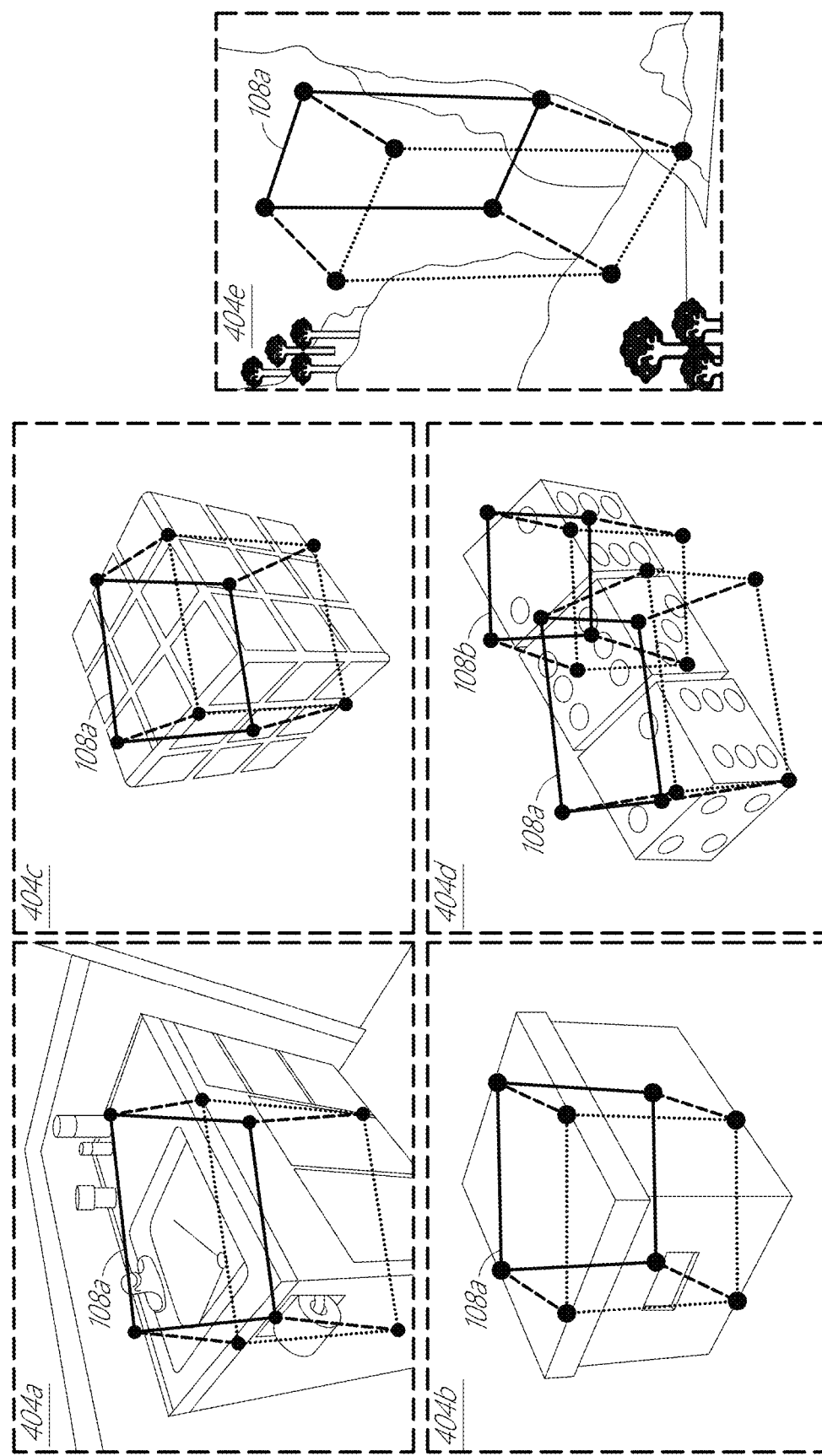

FIGS. 7A-7F are graphs illustrating example deep cuboid detector evaluation metrics. APK: Average Precision of Keypoint, PCK: Probability of Correct Keypoint: Normalized distance from GT corners, Order of keypoints: front-top-left, back-top-left, front-bottom-left, front-top-right, back-bottom-left, front-bottom-right, back-top-right, back-bottom-right. B: bounding box loss, C: corner loss, and I: iterative. FIGS. 4A-4F show images illustrating example cuboid detection and keypoint location using VGG16 as the CNN tower and iterative feature pooling. The cuboid detector 200 was able to localize the vertices of cuboids in consumer-grade RGB images. The cuboid detector 200 was able to handle both objects like boxes (that are perfectly modeled by a cuboid) as well as objects like sinks (that are only approximate cuboids). FIG. 4G show example images 404a-404e illustrating improper cuboid detection and keypoint localization, which can be reduced or eliminated as further described below.

In one implementation, the cuboid detector 2 achieved a mAP of 75.47 for bounding box detection, which was significantly better than the HOG-based system with a mAP of 24.0.

Multi-Task Learning.

Multiple network each performing different multiple tasks were trained. A base network that just output bounding boxes around cuboids was trained. This base network performed general object detection using rectangles enclosing cuboids. The base network output the class of the box and the bounding box regression values. Next, a different network with additional supervision about the location of the corners was trained. This network did not output bounding box regression coordinates. Then, a network (e.g., the cuboid detector 200) that output both the bounding box regression values and the coordinates of the vertex was trained. A corresponding term was added to the loss function for each additional task. From testing, adding more tasks (bounding box detection, keypoint localization, or both bounding box detection and keypoint localization), affected the performance of the cuboid detector (see Table 1).

TABLE 1

Multi-task learning Results. A network was trained using only the bounding box loss, then using the cuboid corner loss.

| Additional loss function | AP | APK | PCK |
|---|---|---|---|
| Bounding Box Loss | 66.33 | — | — |
| Corner Loss | 58.39 | 28.68 | 27.64 |
| Bounding Box + Corner Loss | 67.11 | 34.62 | 29.38 |

Iterative Feature Pooling.

Figure 5A:
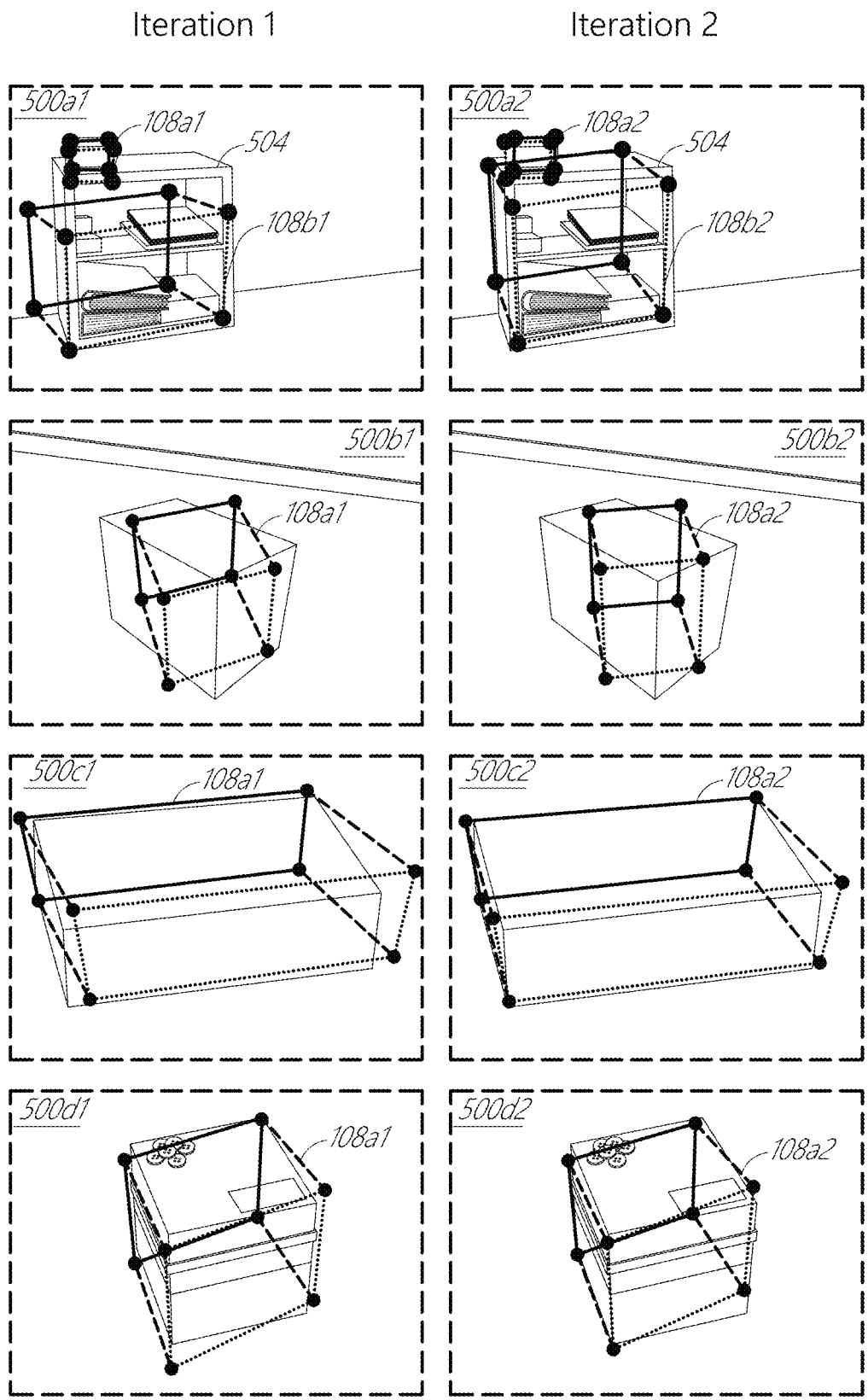
FIGS. 5A-5C show example images showing improved performance with keypoint refinement via iterative feature pooling.
Figure 5B:
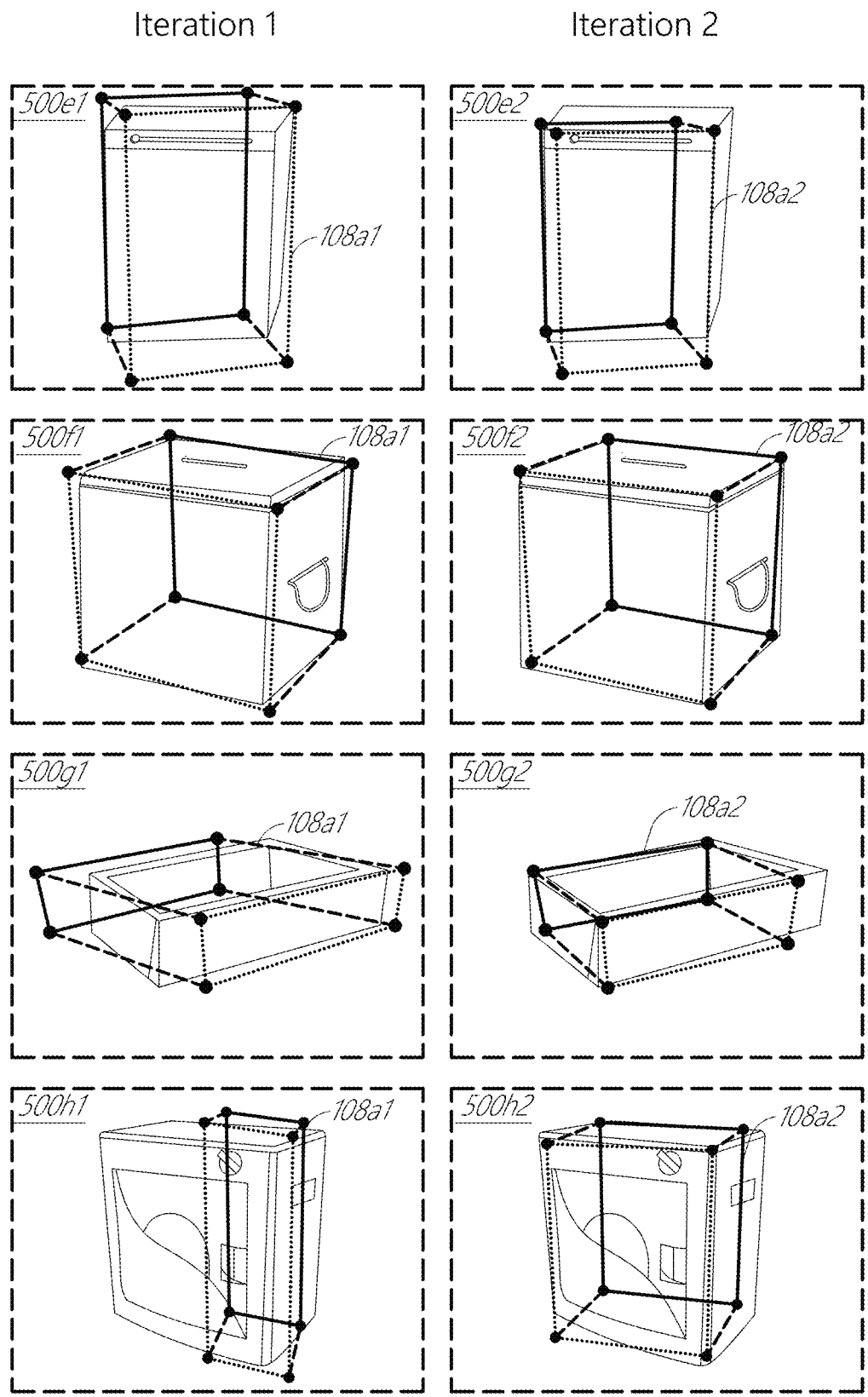
Figure 5C:
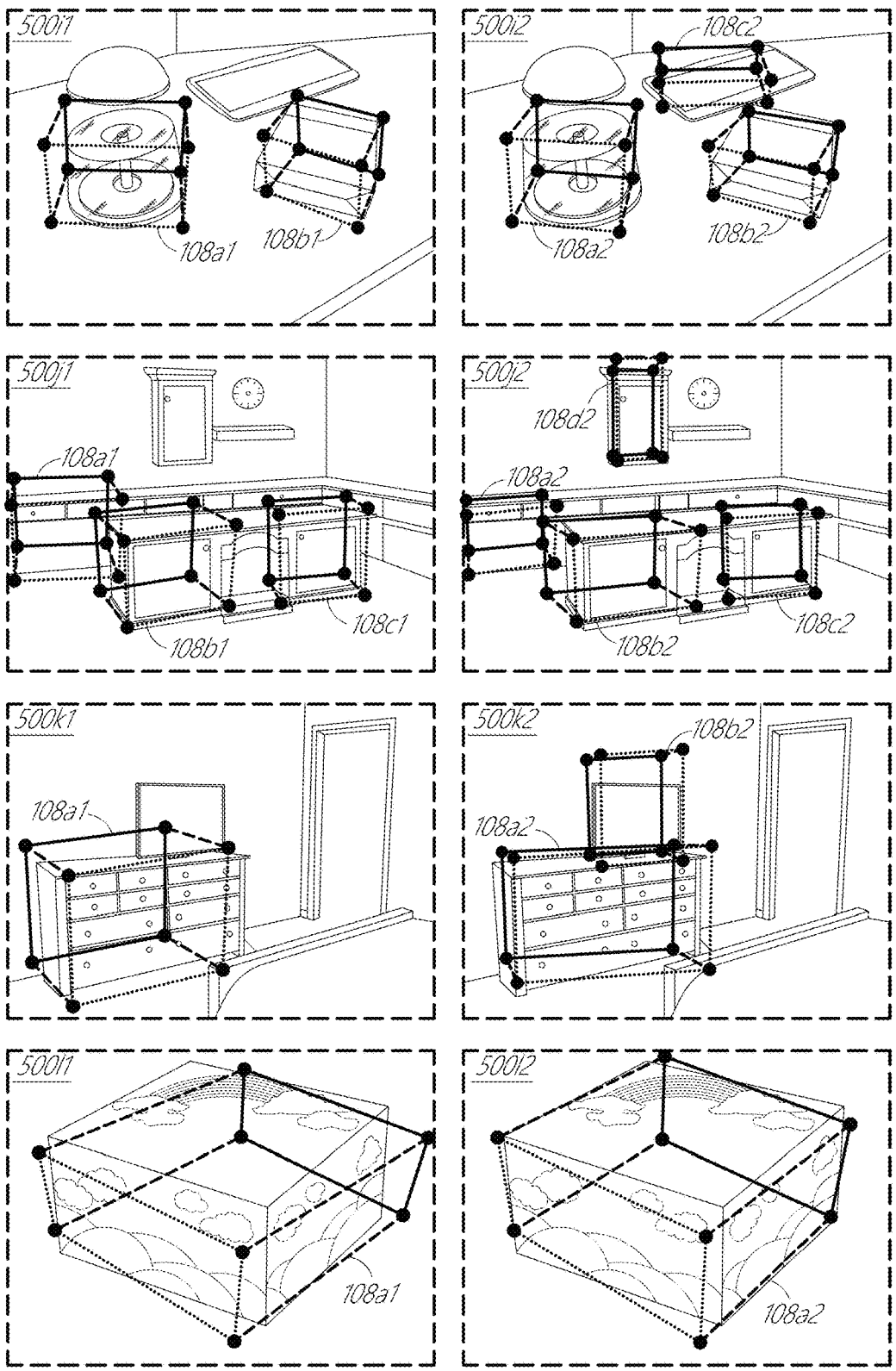

In R-CNN, the final output is a classification score and the bounding box regression values for every region proposal. The bounding box regression allows moving the region proposal around and scaling it such that the final bounding box localizes just the object. This implies that the initial region from which the features are pooled to make this prediction was not entirely correct. In some embodiments, the cuboid detector 200 goes back and pools features from the refined bounding box. This can be implemented in the network itself, meaning that the cuboid detector 200 performs iterative bounding box regression while training and testing in exactly the same way. The input to the fully-connected layers 216 of the regressor is a fixed-size feature map, a submap the convolutional feature map 228, that includes of the pooled features from different region proposals from conv5 layer. The R-CNN outputs can be used for bounding box regression on the input object proposals to produce new proposals. Then features can be pooled from these new proposals and passed through the fully-connected layers 216 of the regressor again. In some embodiments, the cuboid detector 200 is an "any-time prediction system" where for applications which are not bound by latency, bounding box regression can be performed more than once. The performance results (see Table 2) show that iterative feature pooling can greatly improve both bounding box detection and vertex localization (see FIGS. 5A-5C). There was not a significant change in performance when features were iteratively pooled two or more times (e.g., 2, 3, 4, 5, 6, or more times). In some implementations, two iterations are used. FIGS. 5A-5C show example images 500a1-50011, 500a2-50012 illustrating improved performance (e.g., compare the representations 108b1, 108b2 of the cuboid in images 500a1, 500a2 and the shape of the bookcase 504 in these images 504. with keypoint refinement via iterative feature pooling. Cuboid detection regions were refined by re-pooling features from conv5 using the predicted bounding boxes.

TABLE 2

Results for Iterative Feature Pooling. Iterative feature pooling improved the box detection AP by over 4% and PCK over 7%.

| Method | AP | APK | PCK |
|---|---|---|---|
| Corner Loss | 58.39 | 28.68 | 27.64 |
| Corner Loss + Iterative | 62.89 | 33.98 | 35.56 |
| BB + Corner Losses | 67.11 | 34.62 | 29.38 |
| BB + Corner Loss + Iterative | 71.72 | 37.61 | 36.53 |

Depth of Network.

Two base models, VGG16 and VGG-M, were tested. While VGG16 has a very deep architecture with 16 layers, VGG-M is a smaller model with 7 layers. Table 3 shows the results of the testing. Interestingly, for this dataset and task, two iterations through the shallower network outperformed one iteration through the deeper network. Coupled with the fact the shallower network with iteration run twice as fast, a cuboid detector 200 can advantageously include a shallower CNN tower with fewer than 10 layers (e.g., 5, 7, or 9 layers). In some embodiments, a cuboid detector 200 can include a deeper CNN tower (e.g., 12, 15, 20, or more layers). The four model tested each had average precision (AP) higher than the AP of a HOG-based system (24.0).

TABLE 3

VGG-M (7 layers) vs. VGG16 (16 layers) base network. I: iterative feature pooling was performed. The deeper cuboid detector outperformed the shallower one.

| Method | AP | APK | PCK | Size | Speed |
|---|---|---|---|---|---|
| VGG-M | 67.11 | 34.62 | 29 | 334 MB | 14 fps |
| VGG-M + I | 71.72 | 37.61 | 36 | 334 MB | 10 fps |
| VGG16 | 70.50 | 33.65 | 35 | 522 MB | 5 fps |
| VGG16 + I | 75.47 | 41.21 | 38 | 522 MB | 4 fps |

Effect of Training Set Size.

The impact of increasing the size of training data was measured. Three datasets of varying sizes, 1K, 2K and 3K images, were created and used to train a common network (VGG-M+Iterative). The results (see Table 4) show significantly improved performance when using larger training set sizes.

TABLE 4

Performance vs. number of training images. Deep cuboid detection can benefit from more training images.

| Number of Images | AP | APK | PCK |
|---|---|---|---|
| 1000 | 40.47 | 20.83 | 26.60 |
| 2000 | 52.17 | 27.51 | 29.31 |
| 3000 | 71.72 | 37.61 | 26.53 |

Memory and Runtime Complexity.

The cuboid detector 200 was able to run at interactive rates on a Titan Z GPU while the HOG-based approach would take minutes to process a single image. The real-time nature of the system may be the result of Faster R-CNN being used as the regressor. In some embodiments, the cuboid detector 200 can implement a single show multibox detector (SSD) to further improve its speed performance. Table 3 shows the model sizes, which can be reduced to on mobile devices (e.g., the wearable display system 1000 descried with reference to FIG. 10).

Example Keypoint Parameterizations

An embodiment of the cuboid detector 200 can output a cuboid's vertices directly. Many convex cuboids have eight vertices, six faces, and twelve edges (not all of which may be visible in an image). However, certain viewpoints may have an inherent ambiguity, which may have led to the improper cuboid identification shown in FIG. 4G. For example, which face of the cube in FIG. 4G should be labelled the front? Since the cuboid detector 200 detector may need to deal with such configurations, alternate cuboid parametrizations were explored. If the world origin is considered to coincide with camera center coordinates, a parameterization of a cuboid can be represented with 12 numbers. The following parameterization may be minimal; in other parameterizations, additional or different parameters can be used.

(X, Y, Z)—Coordinates of the center of the cuboid in 3D
(L, W, H)—Dimensions of the cuboid
($\theta$, $\psi$, $\varphi$)—3 angles of rotation of the cuboid (e.g., Euler angles)
(f, $C_x$, $C_y$)—Intrinsic camera parameters (e.g., focal length and coordinates of the optical center)

For many modern cameras, no skew in the camera and equal focal lengths (in orthogonal directions) can be assumed. The over-parameterization of a cuboid (e.g., a sixteen-parameter parameterization of a cuboid) may allow a cuboid detector 200 to produce outputs that do not represent cuboids (see, e.g., some examples in FIG. 4G). Several different re-parameterizations of a cuboid were tested to better utilize the geometric constraints. In general, the test results show that the network was able to learn features for tasks that had more visual evidence in the image and predict parameters which can be scaled properly for stable optimization. When dealing with 3D geometry and deep learning, proper parametrization is advantageous. Even image-to-image transformations, such as like homographies (e.g., isomorphisms of projected spaces) may benefit from re-parametrization (e.g., the four-point parametrization). Such techniques may reduce or eliminate improper identification of cuboids in images.

Six-Corner Parametrization.

Figure 6:
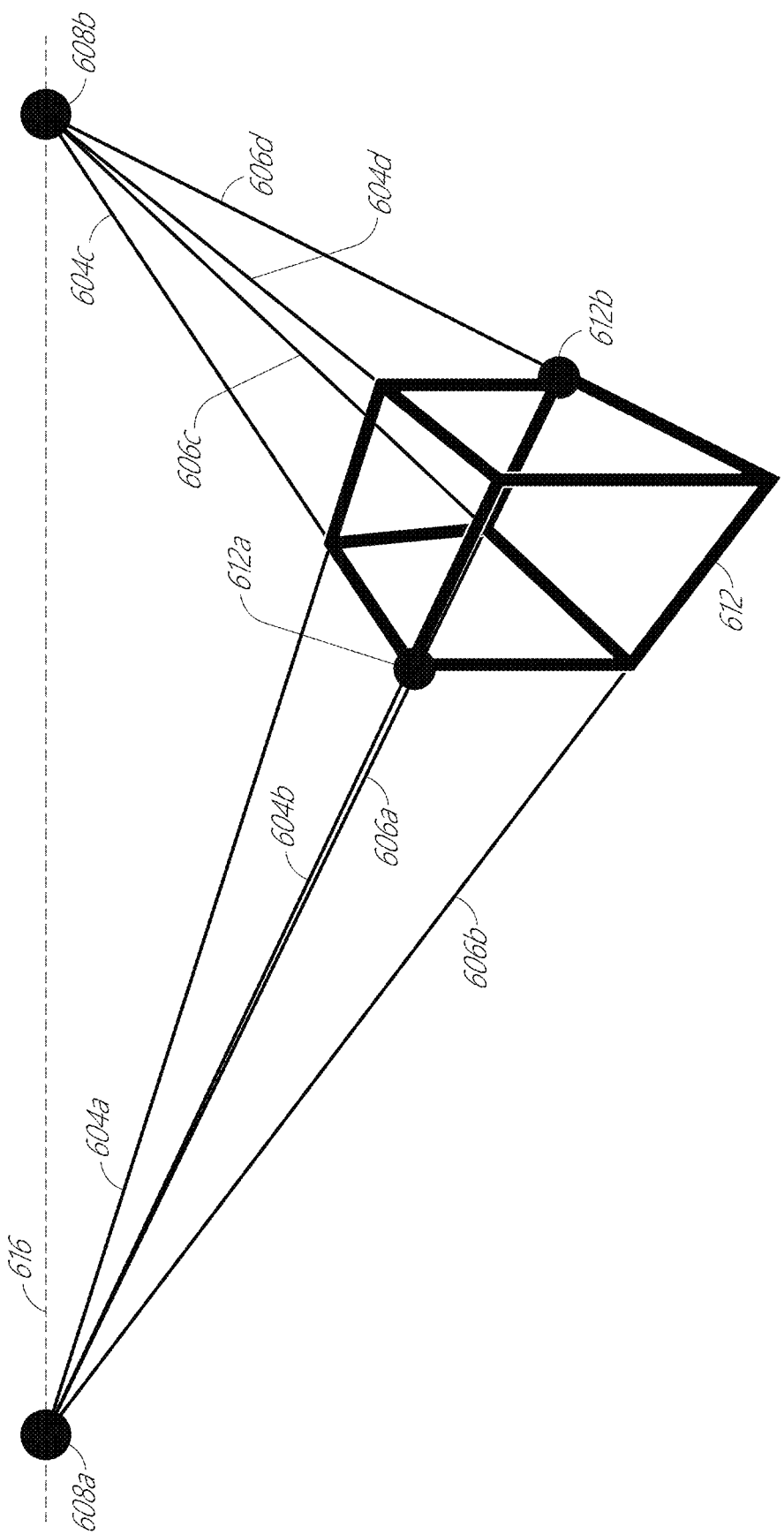
FIG. 6 is a schematic illustration show example cuboid vanishing points.
Figure 7B:
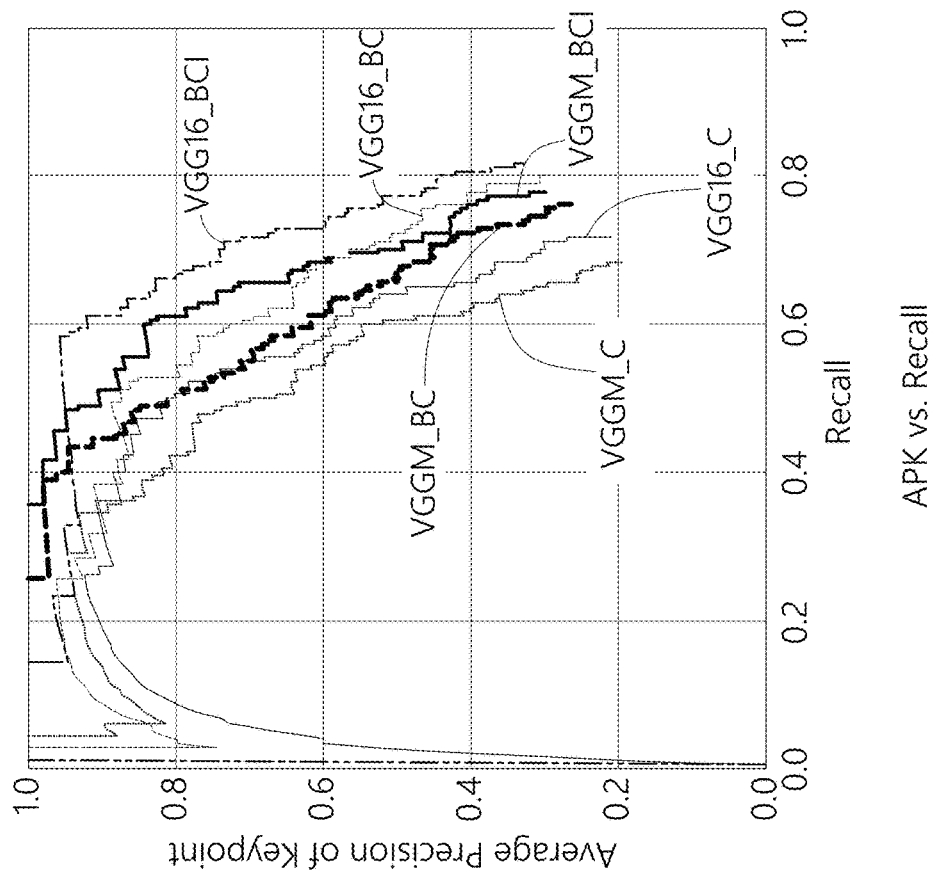
FIGS. 7A-7F are plots showing example performance a cuboid detector.
Figure 7A:
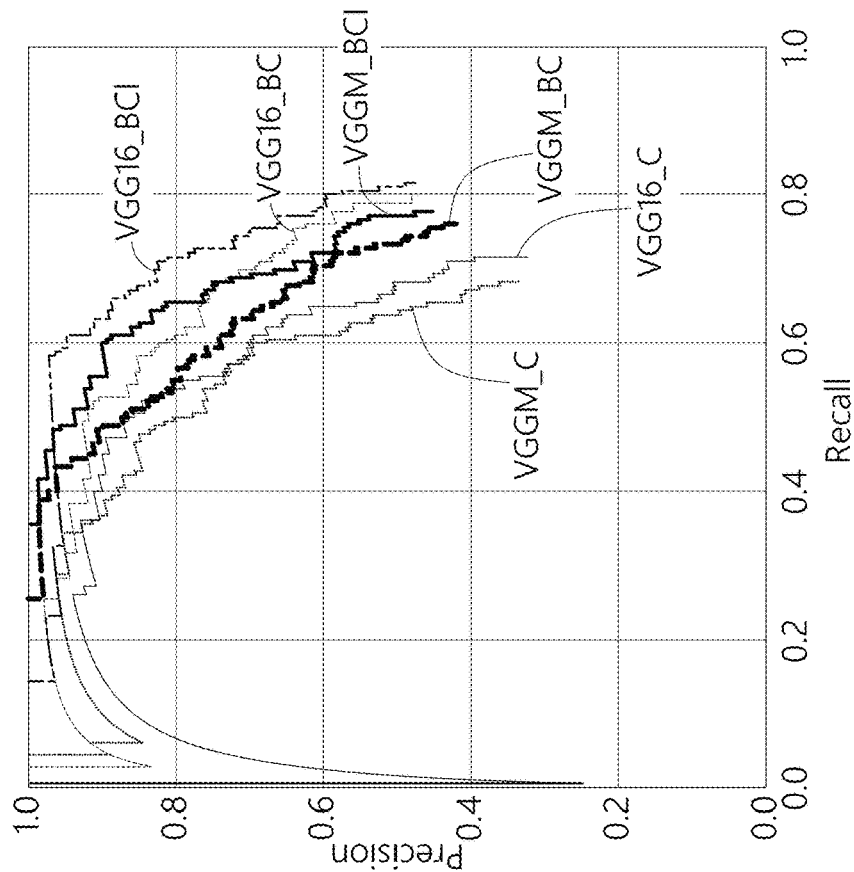
Figure 7D:
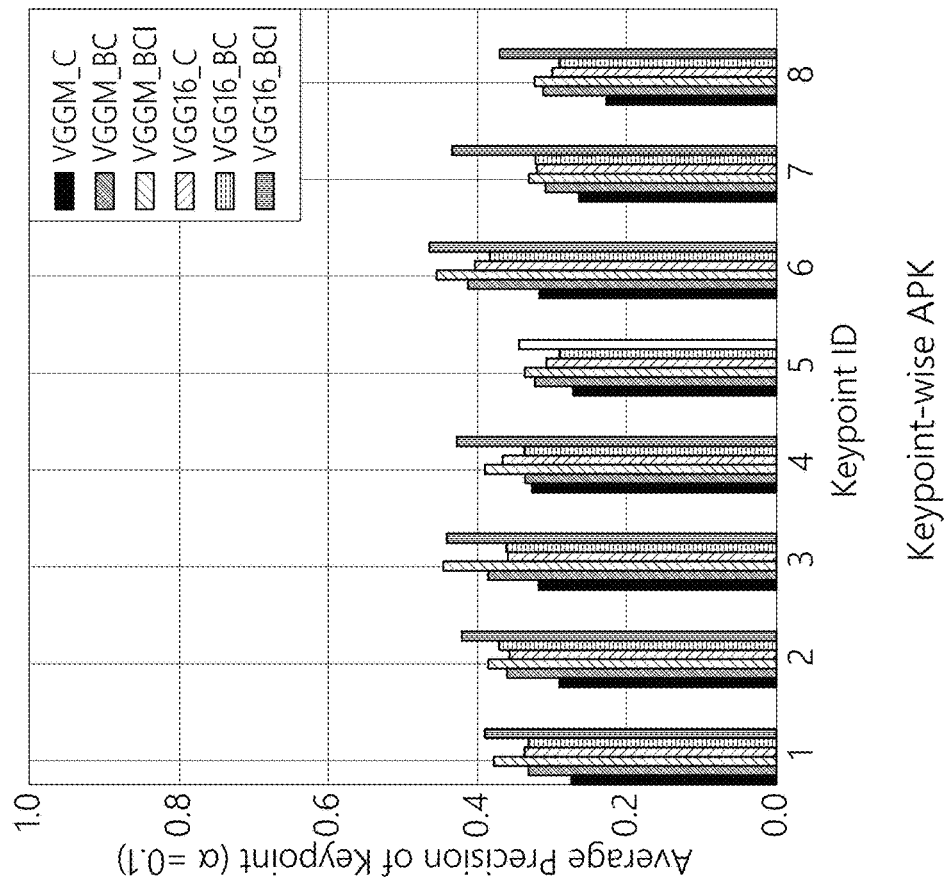
Figure 7C:
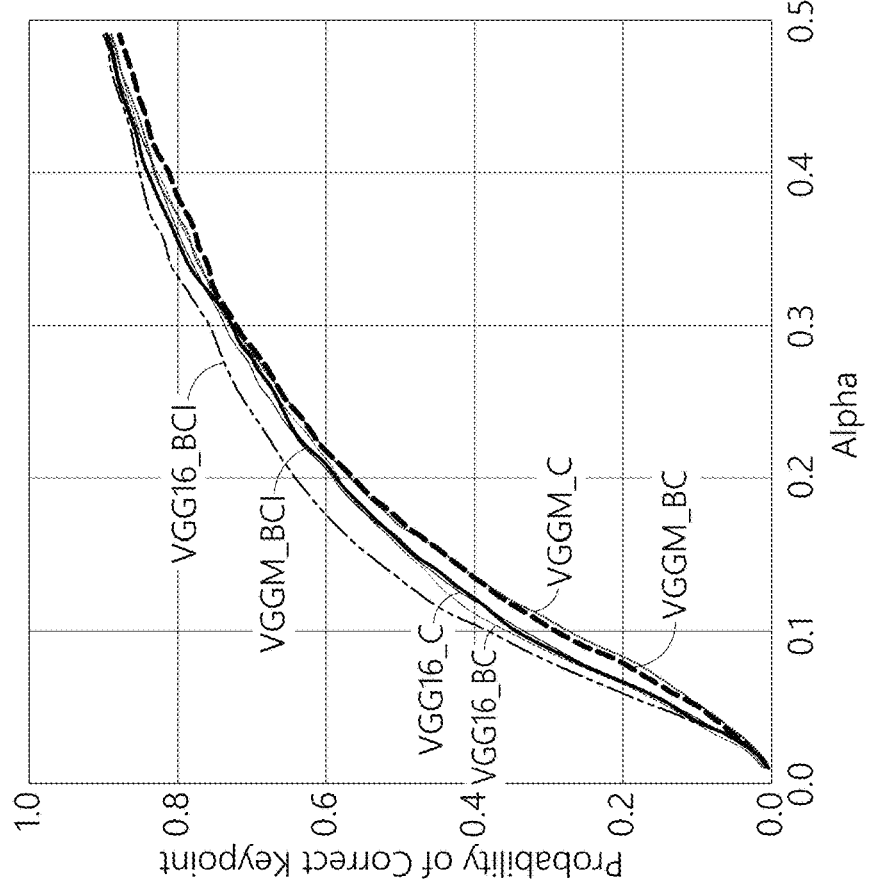
Figure 7E:
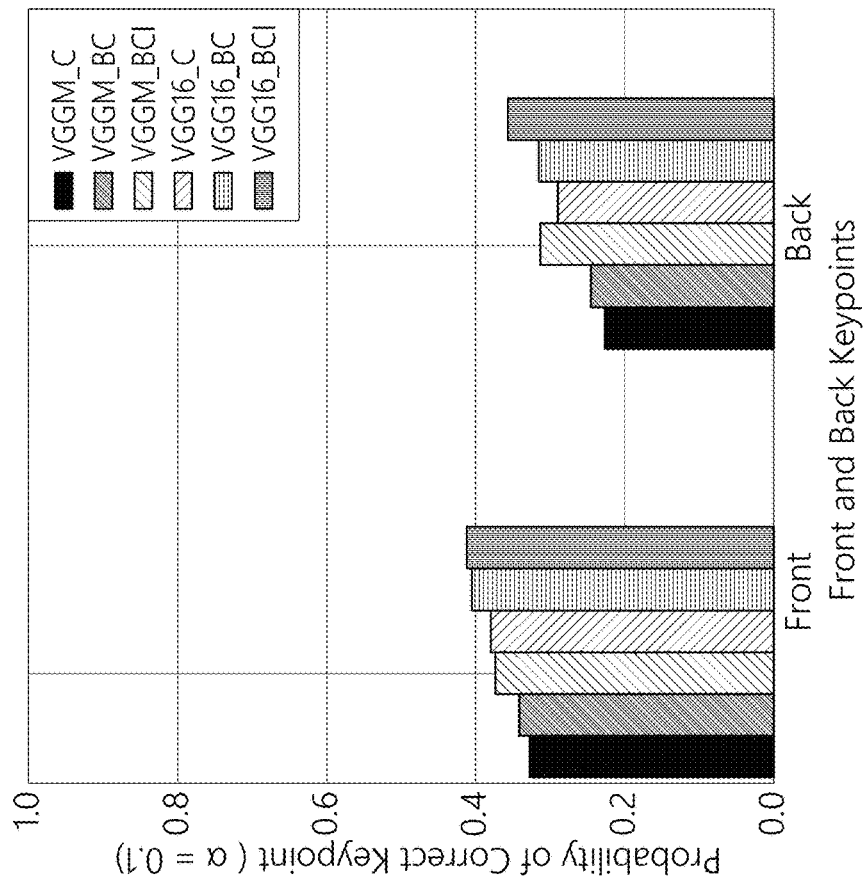
Figure 7F:
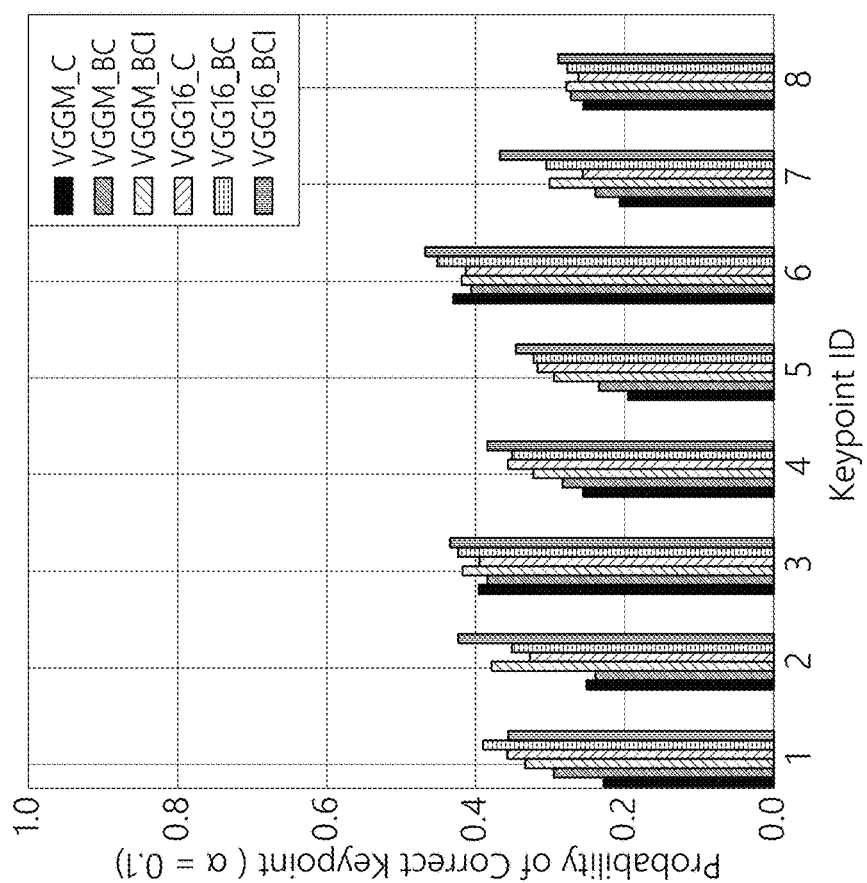

An alternate parameterization in which only six coordinates of eight cuboid vertices were predicted by the detector. The locations of the remaining two coordinates were inferred using the relationship that there may be parallel edges in cuboids. For example, the edges that are parallel in 3D meet at the vanishing point in the image. There may be two pairs of parallel lines on the top base of the cuboid 600 and two pairs of parallel lines on the bottom face of the cuboid. The pair of parallel lines 604a, 604b on the top face of the cuboid 600 and the pair parallel line 606a, 606b on the bottom face of the cuboid should meet at the same vanishing point 608a as shown in FIG. 6. The pair of parallel lines 604c, 604d on the top face of the cuboid 600 and the pair parallel line 606c, 606d on the bottom face of the cuboid should meet at the same vanishing point 608b. Accordingly, the position of the remaining two points 612a, 612b can be inferred. This allows a cuboid detector 200 to parameterize an output of 12 numbers in some implementations. FIG. 6 schematically illustrates example cuboid vanishing points 608a, 608b. Vanishing points 608a, 608b produced by extrapolating the edges of a cube form a vanishing line 616 and can be used to reduce the number of parameters. The Front-Top-Left (FTL) keypoint 612a and Back-Bottom-Right (BBR) keypoint 612b can be excluded from the parametrization and inferred using estimated vanishing points (VPs) techniques.

Eight-corner parameterization was compared with six-corner parameterization. The ground truth data for two vertices was not used while training. One vertex from each the back and front faces was dropped (those whose detection rates (PCK) were the worst). A network was trained to predict the location of the remaining six corners. The locations of the two dropped vertices were inferred using these six corners. The cuboid detector 200 first determined the vanishing points corresponding to the six points predicted. This re-parameterization may lead to a reduction in performance (see Table 5). This degradation may be due to the fact that visual evidence corresponding to the two inferred corners present in the image was discarded. Also, any error in prediction of one vertex due to occlusion or any other reason would directly propagate to the inferred corners. However, left to the cuboid detector 200, it learned multiple models to detect a cuboid. The network of the cuboid detector 200 was free to use all visual evidence to localize the corners of the cuboid. The cuboid detector 200 was capable of doing pure geometric reasoning because in many cases the corner on the back did not have visual evidence in the image due to self-occlusion.

TABLE 5

Eight-Corner vs. six-corner parameterization. Eight-corner parameterization uses all of the cuboid's corners, whereas in the six-corner parameterization, the BBR and FTL corners are dropped (see FIG. 6) and inferred from the vanishing points. This shows how an example network was able to do geometric reasoning and the over-parameterization may add robustness to the system. BBR: Back-Bottom-Right and FTL: Front-Top-Left.

| Method | AP | APK | PCK | PCK of BBR Corner | PCK of FTL Corner | PCK of Remaining Corners |
|---|---|---|---|---|---|---|
| 6 corners | 65.26 | 29.64 | 27.36 | 24.44 | 21.11 | 28.89 |
| 8 corners | 67.11 | 34.62 | 29.38 | 27.22 | 29.44 | 29.73 |

Vanishing Point Parametrization:

Another re-parameterization uses locations of the two vanishing points and the slopes of six lines which will form the edges of the cuboid (see FIG. 6). Note that these vanishing points correspond to a particular cuboid and might be different from the vanishing point of the entire image. The intersection points of these six lines would give the vertices of the cuboid in this example. However, the locations of the vanishing points many lie outside the region of interest and have little or confounding visual evidence in the region of interest or the entire image itself. It also may become difficult to normalize the targets to predict the vanishing points directly. The slopes of the six lines can vary between $-\infty$ and $+\infty$. Instead of predicting the slope directly, the slopes can be regressed to the value of $\sin(\tan^{-1}(\theta))$. There can exist a set of hyperparameters (e.g., loss weights, learning rates, solver, etc.) for which an embodiment of this network can be trained.

Example Process of Training a Cuboid Detector

Figure 8:
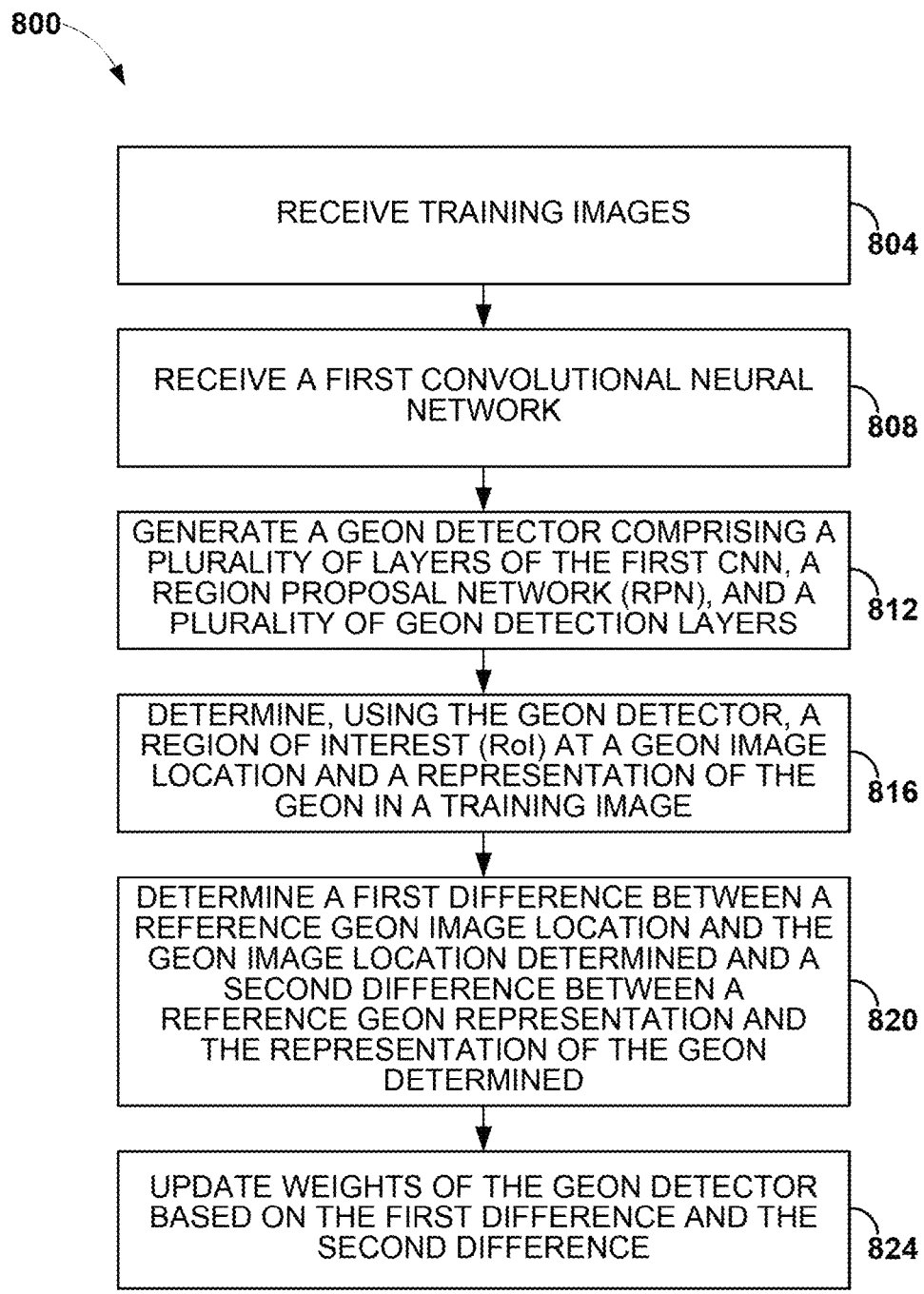
FIG. 8 is a flow diagram of an example process of training a cuboid detector.

FIG. 8 is a flow diagram of an example process 800 of training a cuboid detector. The process 800 starts at block 804, where a plurality of training images each comprising at least one cuboid is received. Some of the training images can each include one or more cuboids. The process 800 can include performing a cuboid-specific (e.g., cuboid-specific) data augmentation strategy to improve the performance of a trained cuboid detector. At block 808, a convolutional neural network is received. The convolutional neural network can be trained for objection detection. For example, the convolutional neural network can be VGG16 or VGG-M. The convolutional neural network can be a deep neural network in some implementations.

At block 812, a cuboid detector is generated. The cuboid detector can include a CNN tower. The CNN tower can include a plurality of convolutional layers and non-convolutional layers of the convolutional neural network received at block 808. For example, the CNN tower can include some or all convolutional layers of the convolutional neural network received. The non-convolutional layers can include a normalization layer, a brightness normalization layer, a batch normalization layer, a rectified linear layer, an upsampling layer, a concatenation layer, a pooling layer, a softsign layer, or any combination thereof. The CNN tower can generate a convolutional feature map from an input image, such as a monocular image.

The cuboid detector can include a region proposal network (RPN), such as a CNN or a DNN. The region proposal network can be connected to a layer of the CNN tower. The region proposal network can determine a region of interest (RoI) comprising a cuboid in the image using the convolutional feature map. For example, the region of interest can be represented as a two-dimensional (2D) bounding box enclosing a cuboid at a cuboid image location. The cuboid can comprise a cuboid, a cylinder, a sphere, or any combination thereof. The RPN can be associated with at least two loss functions, such as a log loss function and a smooth L1 loss function during training.

The cuboid detector can include a pooling layer and at least one regressor layer. The pooling layer can be connected to a layer of the CNN tower. The pooling layer can determine, using the cuboid image location, a submap of the convolutional feature map corresponding to the region of interest comprising the cuboid. The pooling layer and the region proposal network can be connected to the same layer of the CNN tower.

The cuboid detector can include two regressor layers, such as two fully-connected layers, of a regional-CNN (R-CNN) or a fast R-CNN. As another example, the regressor layer is not fully connected. The regressor layer can be associated with at least three loss functions during training. For example, the at least three loss functions comprises a log loss function and a smooth L1 loss function.

The cuboid detector can be trained. At block 816, the cuboid detector can determine a region of interest at an image location comprising a cuboid in a training image received at block 804. In some embodiments, a representation of the cuboid in the image can be determined. To determine the RoI at the cuboid image location and the representation of the cuboid, the cuboid detector can generate a convolutional feature map for the training image using the convolutional layers and non-convolutional layers of the CNN tower. Based on the convolutional feature map, the region proposal network can determine the RoI comprising the cuboid at an initial image location in the training image. Based on the initial image location of the cuboid in the training image, the pooling layer of the cuboid detector can determine a submap of the convolutional feature map corresponding to the RoI comprising the cuboid at the initial image location. The at least one regression layer can determine the RoI at the cuboid image location and the representation of the cuboid. The initial cuboid image location or the cuboid image location can be represented as a two-dimensional (2D) bounding box. In some implementations, the method 800 can include iteratively determining, using the pooling layer, the at least one regressor layer, and the submap of the convolutional feature map corresponding to the RoI comprising the cuboid, the RoI at the cuboid image location and the representation of the cuboid.

The representation of the cuboid can be different in different implementations. The representation can include a parameterized representation of the cuboid. For example, the parameterized representation of the cuboid can include locations of a plurality of keypoints of the cuboid (e.g., a cuboid) in the image, such as six or eight vertices of the cuboid in the image. As another example, the parameterized representation can include normalized offsets of the plurality of keypoints of the cuboid from the center of the image. As a further example, the parameterized representation comprises N tuples, such as 6 tuples. As an example, the parameterized representation of the cuboid comprises a vanishing point parameterization.

At block 820, a first difference between a reference image location and the determined image location and a second difference between a reference representation of the cuboid and the determined representation of the cuboid can be determined. The reference representation of the cuboid can include the ground truth targets for each keypoint as illustrated in Equations [1] and [2] above. The reference image location can include a bounding box represented by the ground truth targets.

At block 824, weights of the cuboid detector can be updated based on the first difference and the second difference. The differences can be represented as the loss function (or components thereof) shown in Equation [3]. Some or all of the weights of the cuboid detector can be updated based on the differences determined. For example, the weights of the region proposal network and the weights of the at least one regressor layer can be updated based on the differences. As another example, the weights of the RPN and the weights of the at least one regressor layer can be updated without updating the weights of the first CNN based on the differences. As a further example, the weights of the CNN tower, the weights of the region proposal network, and the weights of the at least one regressor layer can be updated based on the differences. The process 800 can optionally include training the cuboid detector from a larger dataset and synthetic data, network optimization, and regularization techniques to improve generalization.

Figure 9:
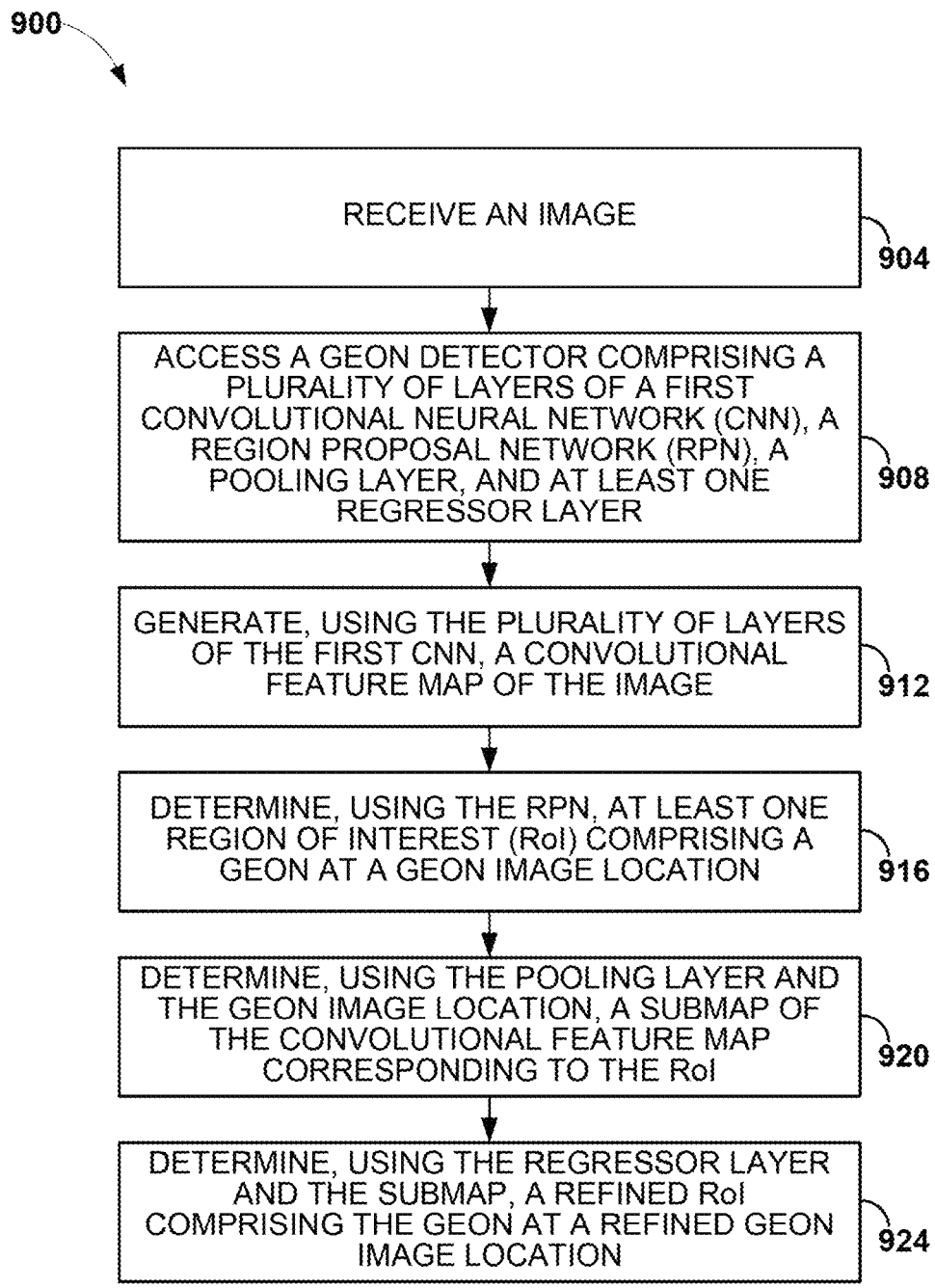
FIG. 9 is a flow diagram of an example process of using a cuboid detector for cuboid detection and keypoint localization.

Example Process of Using a Cuboid Detector for Cuboid Detection and Keypoint Localization FIG. 9 is a flow diagram of an example process 900 of using a cuboid detector for cuboid detection and keypoint localization. The process 900 starts at block 904, where a system (e.g., the wearable display system 1000 described with reference to FIG. 10) receives an input image including a possible cuboid. The image can include one or more cuboids. The image can comprise a color image (e.g., RGB or RGB-D) and the image may be monocular. The image may be a frame of a video and may be obtained using the outward-facing imaging system 1044 of the wearable display system 1000 described with reference to FIG. 10.

At block 908, the wearable display system 1000 can access a cuboid detector (such as the cuboid detector trained by the process 800 illustrated in FIG. 8). The cuboid detector can include a CNN tower comprising a plurality of convolutional layers and non-convolutional layers. The cuboid detector can include a region proposal network connected to the CNN tower. The cuboid detector can include a pooling layer and at least one regressor layer. The pooling layer can be connected to the CNN tower.

At block 912, the wearable display system 1000 can generate, using the plurality of convolutional layers and the non-convolutional layers of the CNN tower and the image, a convolutional feature map (e.g., the convolutional feature map 228 in FIG. 2). At block 916, the wearable display system 1000 can determine, using the region proposal network, at least one RoI comprising a cuboid at a cuboid image location of the image (e.g., the regions of interest 220a1, 220a2, 220b in FIG. 2). The cuboid image location can be represented as a two-dimensional (2D) bounding box. At block 920, the wearable display system 1000 can determine, using the pooling layer (e.g., the pooling layer 212 in FIG. 2) and the cuboid image location, a submap of the convolutional feature map corresponding to the region of interest comprising the cuboid. For example, the submap can be determined from the regions 224a of the convolutional feature map 228 from which the features can be pooled in FIG. 2. At block 924, the wearable display system 1000 can determine, using the regressor layer (e.g., a R-CNN regressor) and the submap, a refined RoI at a refined cuboid image location and a representation of the cuboid. The refined cuboid image location can be represented as a two-dimensional (2D) bounding box.

In some embodiments, the method 900 includes iterative feature pooling. For example, the wearable display system 1000 can determine using the refined cuboid image location, a refined submap of the convolutional feature map corresponding to the refined region of interest comprising the cuboid. For example, the submap can be determined from the regions 224b of the convolutional feature map 228 from which the features can be pooled in FIG. 2. The wearable display system 1000 can determine, using the pooling layer, the at least one regressor layer, and the refined submap of the convolutional feature map corresponding to the refined RoI, a further refined RoI at a further refined cuboid image location and a further defined representation of the cuboid.

The wearable display system 1000 can interact with a user of the system based on the refined region of interest at the refined cuboid image location and the representation of the cuboid. For example, the cuboid can correspond to a stationary box, and the wearable display system 1000 can generate character animation in relation to the stationary box based on the refined image location of the cuboid and the representation of the cuboid. As another example, the cuboid can correspond to a hand-held cuboid. The wearable display system 1000 can determine a pose of the cuboid using the representation of the cuboid, and interact with the user of the system based on the pose of the cuboid. As a further example, the cuboid can correspond to a rare object not recognizable by a CNN. The wearable display system 1000 can provide the user with a notification that the rare object not recognizable by the CNN is detected. As an example, the cuboid corresponds to a man-made structure (e.g., a building). The wearable display system 1000 can assist the user of the system during an unmanned flight based on the refined RoI at the refined cuboid image location and the representation of the cuboid. As another example, the cuboid can be a cuboid that corresponds to a marker. The wearable display system 1000 can perform simultaneous location and mapping (SLAM) based on the pose of the cuboid.

Example Applications

Detecting box-like objects in images and extracting 3D information like pose can help overall scene understanding. Many high-level semantic problems can be tackled by first detecting boxes in a scene (e.g., extracting the free space in a room by reducing the objects in a scene to boxes, estimating the support surfaces in the scene and estimating the scene layout).

The cuboid detectors disclosed herein can open up one or more possibilities for augmented reality (AR), human-computer interaction (HCI), autonomous vehicles, drones, or robotics in general. For example, the cuboid detector can be used as follows.

For Augmented Reality, cuboid vertex localization followed by 6-degree of freedom (6-dof) pose estimation allows a content creator to use the cuboid-centric coordinate system defined by a stationary box to drive character animation. Because the volume of space occupied by the stationary cuboid is known based on cuboid vertex location followed by 6-dof pose estimation, animated characters can jump on the box, hide behind it, and even start drawing on one of the box's faces. Accordingly, a content creator can use the cuboid detector to build dynamic worlds around cuboids.

For Human-Computer Interaction, users may interact with scenes using boxy objects around them. A content creator may create a game or user environment in which worlds are built up from cuboids. As another example, a hand-held cuboid can be used as a lightweight game controller. A system, such as the wearable display system 1000 descried with reference to FIG. 10, can include a camera capturing images of the hand-held cube over time. And the system can estimate the cube's pose, effectively tracking the cube in 3D space, using the images captured. In some embodiments, the cuboid can serve as a way to improve interaction in AR systems (e.g., the tabletop AR demo using cuboids).

For autonomous vehicles, 3D cuboid detection allows the vehicle to reason about the spatial extent of rare objects that might be missing in supervised training set. By reasoning about the pose of objects in a class-agnostic manner, autonomous vehicles can be safer drivers.

For drones, man-made structures, such as buildings, houses, or cars, can be well-approximated with cuboids, assisting navigation during unmanned flights. For robotics in general, detecting box-like objects in images and extracting their 3D information like pose helps overall scene understanding. For example, placing a handful of cuboids in a scene (instead of Aruco markers) can make pose tracking more robust for simultaneous location and mapping (SLAM) applications.

Additional Embodiments

In some embodiments, the cuboid detector does not rely on bottom-up image processing and works satisfactorily on real images in real-time. The cuboid detector can be trained using a large training database of 3D models and some kind of learning for 2D-to-3D alignment. In some implementations, the cuboid detector can implement a geometry-based method, a deformable parts model, a histogram oriented gradients (HOG)-based model (e.g., a HOG classifier). The cuboid detector can detect cuboid vertices in different views and determine a final cuboid configuration based on a score from the HOG classifier, 2D vertex displacement, edge alignment score and a 3D shape score that takes into account how close the predicted vertices are to a cuboid in 3D. The cuboid detector can jointly optimize over visual evidence (corners and edges) found in the image while penalizing the predictions that stray too far from an actual 3D cuboid.

Without being limited by theory, the cuboid detector may owe its performance convolutional neural networks. A CNN can be superior to existing methods for the task of image classification. To localize a cuboid in an image, the image is broken down into regions and these regions are classified instead, for example, in real-time. The cuboid detector can perform detection in a single step. A cuboid detector, for example, running on the wearable display system 1000 descried with reference to FIG. 10, can process 50-60 frames per second, thus performing real-time cuboid detection and keypoint localization. The iterative keypoint refinement implemented by the cuboid detector can be based on iterative error feedback approach of, the network cascades in, the iterative bounding box regression of Multi-Region CNN and Inside-Outside Networks. Alternatively, or additionally, the iterative keypoint refinement implemented by the cuboid detector can be based on a Recurrent Neural Networks.

Example NN Layers

A layer of a neural network (NN), such as a deep neural network (DNN) can apply a linear or non-linear transformation to its input to generate its output. A deep neural network layer can be a normalization layer, a convolutional layer, a softsign layer, a rectified linear layer, a concatenation layer, a pooling layer, a recurrent layer, an inception-like layer, or any combination thereof. The normalization layer can normalize the brightness of its input to generate its output with, for example, L2 normalization. The normalization layer can, for example, normalize the brightness of a plurality of images with respect to one another at once to generate a plurality of normalized images as its output. Non-limiting examples of methods for normalizing brightness include local contrast normalization (LCN) or local response normalization (LRN). Local contrast normalization can normalize the contrast of an image non-linearly by normalizing local regions of the image on a per pixel basis to have a mean of zero and a variance of one (or other values of mean and variance). Local response normalization can normalize an image over local input regions to have a mean of zero and a variance of one (or other values of mean and variance). The normalization layer may speed up the training process.

The convolutional layer can apply a set of kernels that convolve its input to generate its output. The softsign layer can apply a softsign function to its input. The softsign function (softsign(x)) can be, for example, (x/(1+|x|)). The softsign layer may neglect impact of per-element outliers. The rectified linear layer can be a rectified linear layer unit (ReLU) or a parameterized rectified linear layer unit (PReLU). The ReLU layer can apply a ReLU function to its input to generate its output. The ReLU function ReLU(x) can be, for example, max(0, x). The PReLU layer can apply a PReLU function to its input to generate its output. The PReLU function PReLU(x) can be, for example, x if x≥0 and ax if x<0, where a is a positive number. The concatenation layer can concatenate its input to generate its output. For example, the concatenation layer can concatenate four 5×5 images to generate one 20×20 image. The pooling layer can apply a pooling function which down samples its input to generate its output. For example, the pooling layer can down sample a 20×20 image into a 10×10 image. Non-limiting examples of the pooling function include maximum pooling, average pooling, or minimum pooling.

At a time point t, the recurrent layer can compute a hidden state s(t), and a recurrent connection can provide the hidden state s(t) at time t to the recurrent layer as an input at a subsequent time point t+1. The recurrent layer can compute its output at time t+1 based on the hidden state s(t) at time t. For example, the recurrent layer can apply the softsign function to the hidden state s(t) at time t to compute its output at time t+1. The hidden state of the recurrent layer at time t+1 has as its input the hidden state s(t) of the recurrent layer at time t. The recurrent layer can compute the hidden state s(t+1) by applying, for example, a ReLU function to its input. The inception-like layer can include one or more of the normalization layer, the convolutional layer, the softsign layer, the rectified linear layer such as the ReLU layer and the PReLU layer, the concatenation layer, the pooling layer, or any combination thereof.

The number of layers in the NN can be different in different implementations. For example, the number of layers in the DNN can be 50, 100, 200, or more. The input type of a deep neural network layer can be different in different implementations. For example, a layer can receive the outputs of a number of layers as its input. The input of a layer can include the outputs of five layers. As another example, the input of a layer can include 1% of the layers of the NN. The output of a layer can be the inputs of a number of layers. For example, the output of a layer can be used as the inputs of five layers. As another example, the output of a layer can be used as the inputs of 1% of the layers of the NN.

The input size or the output size of a layer can be quite large. The input size or the output size of a layer can be n×m, where n denotes the width and m denotes the height of the input or the output. For example, n or m can be 11, 21, 31, or more. The channel sizes of the input or the output of a layer can be different in different implementations. For example, the channel size of the input or the output of a layer can be 4, 16, 32, 64, 128, or more. The kernel size of a layer can be different in different implementations. For example, the kernel size can be n×m, where n denotes the width and m denotes the height of the kernel. For example, n or m can be 5, 7, 9, or more. The stride size of a layer can be different in different implementations. For example, the stride size of a deep neural network layer can be 3, 5, 7 or more.

In some embodiments, a NN can refer to a plurality of NNs that together compute an output of the NN. Different NNs of the plurality of NNs can be trained for different tasks. A processor (e.g., a processor of the local data processing module 1024 descried with reference to FIG. 10) can compute outputs of NNs of the plurality of NNs to determine an output of the NN. For example, an output of a NN of the plurality of NNs can include a likelihood score. The processor can determine the output of the NN including the plurality of NNs based on the likelihood scores of the outputs of different NNs of the plurality of NNs.

Example Wearable Display System

In some embodiments, a user device can be, or can be included, in a wearable display device, which may advantageously provide a more immersive virtual reality (VR), augmented reality (AR), or mixed reality (MR) experience, where digitally reproduced images or portions thereof are presented to a wearer in a manner wherein they seem to be, or may be perceived as, real.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. For example, displays containing a stack of waveguides may be configured to be worn positioned in front of the eyes of a user, or viewer. The stack of waveguides may be utilized to provide three-dimensional perception to the eye/brain by using a plurality of waveguides to direct light from an image injection device (e.g., discrete displays or output ends of a multiplexed display which pipe image information via one or more optical fibers) to the viewer's eye at particular angles (and amounts of divergence) corresponding to the depth plane associated with a particular waveguide.

In some embodiments, two stacks of waveguides, one for each eye of a viewer, may be utilized to provide different images to each eye. As one example, an augmented reality scene may be such that a wearer of an AR technology sees a real-world park-like setting featuring people, trees, buildings in the background, and a concrete platform. In addition to these items, the wearer of the AR technology may also perceive that he "sees" a robot statue standing upon the real-world platform, and a cartoon-like avatar character flying by which seems to be a personification of a bumble bee, even though the robot statue and the bumble bee do not exist in the real world. The stack(s) of waveguides may be used to generate a light field corresponding to an input image and in some implementations, the wearable display comprises a wearable light field display. Examples of wearable display device and waveguide stacks for providing light field images are described in U.S. Patent Publication No. 2015/0016777, which is hereby incorporated by reference herein in its entirety for all it contains.

Figure 10:
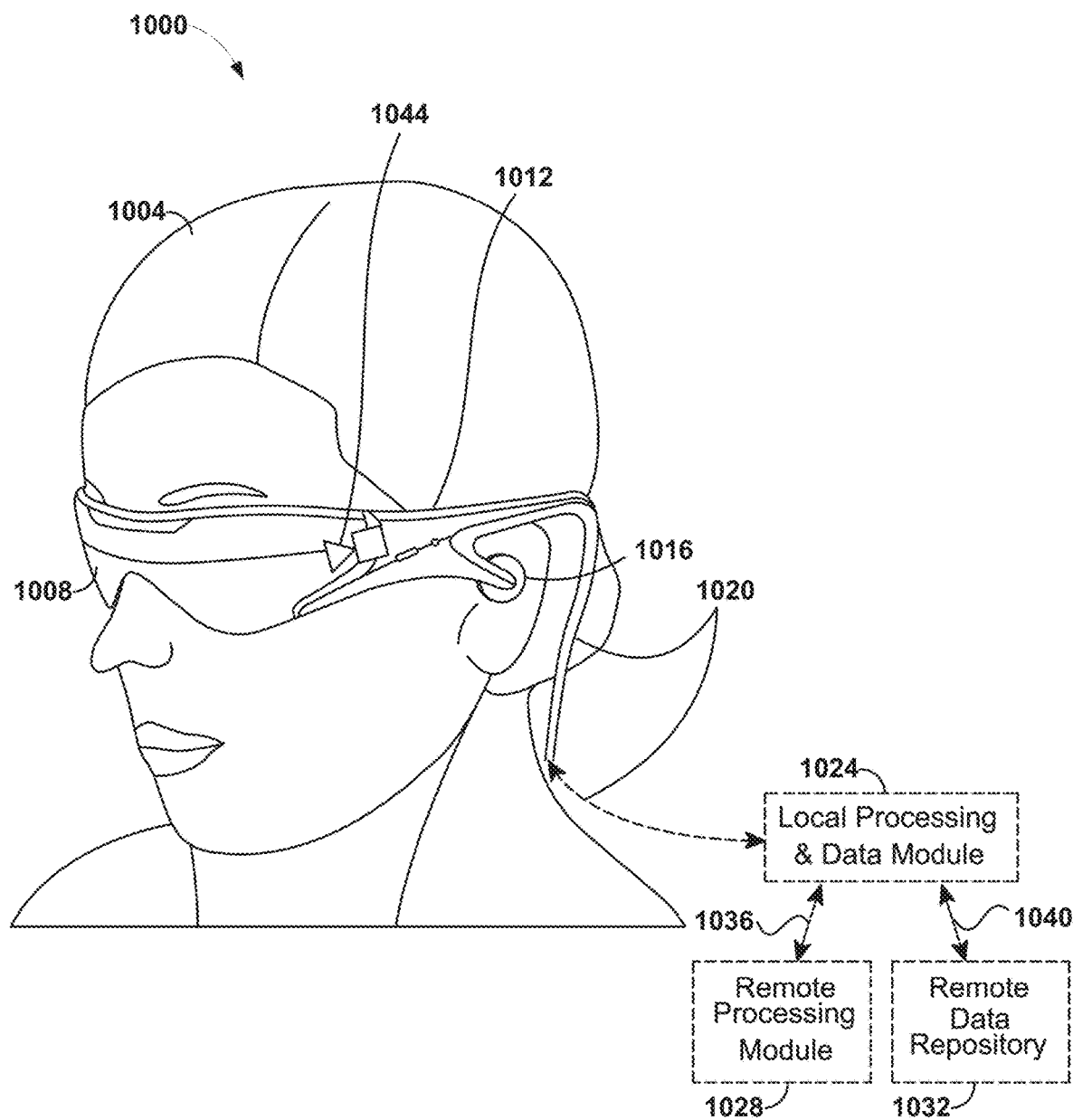
FIG. 10 schematically illustrates an example of a wearable display system, which can implement an embodiment of the deep cuboid detector.

FIG. 10 illustrates an example of a wearable display system 1000 that can be used to present a VR, AR, or MR experience to a display system wearer or viewer 1004. The wearable display system 1000 may be programmed to perform any of the applications or embodiments described herein (e.g., executing CNNs, reordering values of input activation maps or kernels, eye image segmentation, or eye tracking). The display system 1000 includes a display 1008, and various mechanical and electronic modules and systems to support the functioning of that display 1008. The display 1008 may be coupled to a frame 1012, which is wearable by the display system wearer or viewer 1004 and which is configured to position the display 1008 in front of the eyes of the wearer 1004. The display 1008 may be a light field display. In some embodiments, a speaker 1016 is coupled to the frame 1012 and positioned adjacent the ear canal of the user in some embodiments, another speaker, not shown, is positioned adjacent the other ear canal of the user to provide for stereo/shapeable sound control. The display system 1000 can include an outward-facing imaging system 1044 (e.g., one or more cameras) that can obtain images (e.g., still images or video) of the environment around the wearer 1004. Images obtained by the outward-facing imaging system 1044 can be analyzed by embodiments of the deep cuboid detector to detect and localize cuboids in the environment around the wearer 1004.

The display 1008 is operatively coupled 1020, such as by a wired lead or wireless connectivity, to a local data processing module 1024 which may be mounted in a variety of configurations, such as fixedly attached to the frame 1012, fixedly attached to a helmet or hat worn by the user, embedded in headphones, or otherwise removably attached to the user 1004 (e.g., in a backpack-style configuration, in a belt-coupling style configuration).

The local processing and data module 1024 may comprise a hardware processor, as well as non-transitory digital memory, such as non-volatile memory e.g., flash memory, both of which may be utilized to assist in the processing, caching, and storage of data. The data include data (a) captured from sensors (which may be, e.g., operatively coupled to the frame 1012 or otherwise attached to the wearer 1004), such as image capture devices (such as cameras), microphones, inertial measurement units, accelerometers, compasses, GPS units, radio devices, and/or gyros; and/or (b) acquired and/or processed using remote processing module 1028 and/or remote data repository 1032, possibly for passage to the display 1008 after such processing or retrieval. The local processing and data module 1024 may be operatively coupled to the remote processing module 1028 and remote data repository 1032 by communication links 1036, 1040, such as via a wired or wireless communication links, such that these remote modules 1028, 1032 are operatively coupled to each other and available as resources to the local processing and data module 1024. The image capture device(s) can be used to capture the eye images used in the eye image segmentation, or eye tracking procedures.

In some embodiments, the remote processing module 1028 may comprise one or more processors configured to analyze and process data and/or image information such as video information captured by an image capture device. The video data may be stored locally in the local processing and data module 1024 and/or in the remote data repository 1032. In some embodiments, the remote data repository 1032 may comprise a digital data storage facility, which may be available through the internet or other networking configuration in a "cloud" resource configuration. In some embodiments, all data is stored and all computations are performed in the local processing and data module 1024, allowing fully autonomous use from a remote module.

In some implementations, the local processing and data module 1024 and/or the remote processing module 1028 are programmed to perform embodiments of reordering values of input activation maps or kernels, eye image segmentation, or eye tracking disclosed herein. For example, the local processing and data module 1024 and/or the remote processing module 1028 can be programmed to perform embodiments of the process 900 described with reference to FIG. 9. The local processing and data module 1024 and/or the remote processing module 1028 can be programmed to perform cuboid detection and keypoint localization disclosed herein. The image capture device can capture video for a particular application (e.g., augmented reality (AR), human-computer interaction (HCI), autonomous vehicles, drones, or robotics in general). The video can be analyzed using a CNN by one or both of the processing modules 1024, 1028. In some cases, off-loading at least some of the reordering values of input activation maps or kernels, eye image segmentation, or eye tracking to a remote processing module (e.g., in the "cloud") may improve efficiency or speed of the computations. The parameters of the CNN (e.g., weights, bias terms, subsampling factors for pooling layers, number and size of kernels in different layers, number of feature maps, etc.) can be stored in data modules 1024 and/or 1032.

The results of the cuboid detection and keypoint location (e.g., the output of the cuboid detector 200) can be used by one or both of the processing modules 1024, 1028 for additional operations or processing. For example, the processing modules 1024, 1028 of the wearable display system 1000 can be programmed to perform additional applications described herein (such as applications in augmented reality, human-computer interaction (HCI), autonomous vehicles, drones, or robotics in general) based on the output of the cuboid detector 200.

Additional Aspects

In a 1st aspect, a system for cuboid detection and keypoint localization is disclosed. The system comprises: non-transitory memory configured to store: executable instructions, an image for cuboid detection, and a cuboid detector comprising: a plurality of convolutional layers and non-convolutional layers of a first convolutional neural network (CNN) for generating a convolutional feature map from the image, a region proposal network (RPN) comprising a second CNN for determining, using the convolutional feature map, at least one region of interest (RoI) comprising a cuboid at a cuboid image location of the image, and a pooling layer and at least one regressor layer for determining, using the convolutional feature map and the RoI comprising the cuboid, a refined RoI at a refined cuboid image location and a representation of the cuboid; a hardware processor in communication with the non-transitory memory, the hardware processor programmed by the executable instructions to: receive the image; generate, using the plurality of convolutional layers and the non-convolutional layers of the first CNN and the image, the convolutional feature map; determine, using the RPN, the at least one RoI comprising the cuboid at the cuboid image location of the image; determine, using the pooling layer and the cuboid image location, a submap of the convolutional feature map corresponding to the RoI comprising the cuboid; and determine, using the at least one regressor layer and the submap of the convolutional feature map corresponding to the RoI comprising the cuboid, the refined RoI at the refined cuboid image location and the representation of the cuboid.

In a 2nd aspect, the system of aspect 1, wherein the hardware processor is further programmed to: determine, using the refined cuboid image location, a refined submap of the convolutional feature map corresponding to the refined RoI comprising the cuboid; determine, using the pooling layer, the at least one regressor layer, and the refined submap of the convolutional feature map corresponding to the refined RoI comprising the cuboid, a further refined RoI at a further refined cuboid image location and a further defined representation of the cuboid.

In a 3rd aspect, the system of any one of aspects 1-2, wherein the cuboid image location is represented as a two-dimensional (2D) bounding box.

In a 4th aspect, the system of any one of aspects 1-3, wherein the refined cuboid image location is represented as a two-dimensional (2D) bounding box.

In a 5th aspect, the system of any one of aspects 1-4, wherein the non-convolutional layers of the first CNN comprises a normalization layer, a brightness normalization layer, a batch normalization layer, a rectified linear layer, an upsampling layer, a concatenation layer, a pooling layer, a softsign layer, or any combination thereof.

In a 6th aspect, the system of any one of aspects 1-5, wherein the at least one regressor layer comprises two or more layers.

In a 7th aspect, the system of aspect 6, wherein the two or more layers comprise a fully connected layer, a non-fully connected layer, or any combination thereof.

In an 8th aspect, the system of any one of aspects 1-7, wherein the at least one regressor layer is associated with at least three loss functions during training.

In a 9th aspect, the system of aspect 8, wherein the at least three loss functions comprises a log loss function and a smooth L1 loss function.

In a 10th aspect, the system of any one of aspects 1-9, wherein RPN comprises a deep neural network (DNN).

In an 11th aspect, the system of any one of aspects 1-10, wherein the RPN is associated with at least two loss functions during training.

In a 12th aspect, the system of aspect 11, wherein the at least two loss functions comprises a log loss function and a smooth L1 loss function.

In a 13th aspect, the system of any one of aspects 1-12, wherein the representation of the cuboid comprises a parameterized representation of the cuboid.

In a 14th aspect, the system of aspect 13, wherein the parameterized representation of the cuboid comprises locations of a plurality of keypoints of the cuboid in the image.

In a 15th aspect, the system of aspect 14, wherein the plurality of keypoints comprises eight vertices of the cuboid in the image.

In a 16th aspect, the system of aspect 13, wherein the parameterized representation comprises normalized offsets of the plurality of keypoints of the cuboid from the center of the image.

In a 17th aspect, the system of aspect 13, wherein the parameterized representation comprises N tuples.

In an 18th aspect, the system of aspect 13, wherein the parameterized representation of the cuboid comprises 12 parameters.

In a 19th aspect, the system of aspect 13, wherein the parameterized representation of the cuboid comprises a vanishing point parameterization.

In a 20th aspect, the system of any one of aspects 1-19, wherein the hardware processor is further programmed to: interact with a user of the system based on the refined RoI at the refined cuboid image location and the representation of the cuboid.

In a 21st aspect, the system of aspect 20, wherein the cuboid corresponds to a stationary box, and wherein to interact with the user of the system, the hardware processor is further programmed to: generate character animation in relation to the stationary box based on the refined image location of the cuboid and the representation of the cuboid.

In a 22nd aspect, the system of aspect 20, wherein the cuboid corresponds to a hand-held cuboid, and wherein to interact with the user of the system, the hardware processor is further programmed to: determine a pose of the cuboid using the representation of the cuboid; and interact with the user of the system based on the pose of the cuboid.

In a 23rd aspect, the system of aspect 20, wherein the cuboid corresponds to a rare object not recognizable by a third CNN, and wherein to interact with the user of the system, the hardware processor is further programmed to: provide the user with a notification that the rare object not recognizable by the third CNN is detected.

In a 24th aspect, the system of any one of aspects 1-23, wherein the cuboid corresponds to a man-made structure, and wherein the hardware processor is further programmed to: assist a user of the system during an unmanned flight based on the refined RoI at the refined cuboid image location and the representation of the cuboid.

In a 25th aspect, the system of aspect any one of aspects 1-24, wherein the cuboid corresponds to a marker, and wherein the hardware processor is further programmed to: perform simultaneous location and mapping (SLAM) based on the refined RoI at the refined cuboid image location and the representation of the cuboid.

In a 26th aspect, a wearable display system is disclosed. The wearable display comprises: an outward-facing imaging system configured to obtain an image for cuboid detection; and the system for cuboid detection and keypoint localization of any one of aspects 1-25.

In a 27th aspect, a system for training a cuboid detector is disclosed. The system comprises: non-transitory memory configured to store executable instructions; and a hardware processor in communication with the non-transitory memory, the hardware processor programmed by the executable instructions to: receive a plurality of training images each comprising at least one cuboid; generate a cuboid detector, wherein the cuboid detector comprises: a plurality of convolutional layers and non-convolutional layers of a first convolutional neural network (CNN), a region proposal network (RPN) connected to a first layer of the plurality of convolutional layers and non-convolutional layers, and a pooling layer and at least one regressor layer, the pooling layer and the at least one regressor layer connected to a second layer of the plurality of convolutional layers and non-convolutional layers; and train the cuboid detector, wherein to train the cuboid detector, the hardware process is configured to: determine, using the cuboid detector, a RoI at a cuboid image location and a representation of a cuboid in a training image of the plurality of training images; determine a first difference between a reference cuboid image location and the cuboid image location and a second difference between a reference representation of the cuboid and the determined representation of the cuboid; and update weights of the cuboid detector based on the first difference and the second difference.

In a 28th aspect, the system of aspect 27, wherein the cuboid comprises a cuboid, a cylinder, a sphere, or any combination thereof.

In a 29th aspect, the system of any one of aspects 27-28 wherein the first layer of the plurality of convolutional layers and non-convolutional layers and the second layer of the plurality of convolutional layers and non-convolutional layers are identical.

In a 30th aspect, the system of any one of aspects 27-29, wherein to determine the RoI at the cuboid image location and the representation of the cuboid, the hardware processor is further programmed to: generate, using the plurality of convolutional layers and the non-convolutional layers, a convolutional feature map for the at least one training image of the plurality of training images; determine, using the RPN, at least one RoI comprising the cuboid at an initial cuboid image location in the training image; determine, using the initial cuboid image location, a submap of the convolutional feature map corresponding to the at least one RoI comprising the cuboid; and determine, using the pooling layer, the at least one regressor layer, and the submap of the convolutional feature map corresponding to the at least one RoI comprising the cuboid, the RoI at the cuboid image location and the representation of the cuboid.

In a 31st aspect, the system of any one of aspects 27-30, wherein the initial cuboid image location is represented as a two-dimensional (2D) bounding box.

In a 32nd aspect, the system of any one of aspects 27-31, wherein to determine the RoI at the cuboid image location and the representation of the cuboid, the hardware processor is further programmed to: iteratively determine, using the pooling layer, the at least one regressor layer, and the submap of the convolutional feature map corresponding to the RoI comprising the cuboid, the RoI at the cuboid image location and the representation of the cuboid.

In a 33rd aspect, the system of any one of aspects 27-32, wherein the initial cuboid image location is represented as a two-dimensional (2D) bounding box.

In a 34th aspect, the system of any one of aspects 27-33, wherein to update weights of the cuboid detector, the hardware-based processor is programmed to: update the weights of the RPN and the weights of the at least one regressor layer.

In a 35th aspect, the system of any one of aspects 27-33, wherein to update weights of the cuboid detector, the hardware-based processor is programmed to: update the weights of the RPN and the weights of the at least one regressor layer without updating the weights of the first CNN.

In a 36th aspect, the system of any one of aspects 27-33, wherein to update weights of the cuboid detector, the hardware-based processor is programmed to: update the weights of the first CNN, the weights of the RPN, and the weights of the at least one regressor layer.

In a 37th aspect, the system of any one of aspects 27-36, wherein to generate the cuboid detector, the hardware-based processor is programmed to: receive the first CNN.

In a 38th aspect, the system of any one of aspects 27-37, wherein the at least one regressor layer comprises two or more layers.

In a 39th aspect, the system of aspect 38, wherein the two or more layers comprise a fully connected layer, a non-fully connected layer, or any combination thereof.

In a 40th aspect, the system of any one of aspects 27-38, wherein the at least one regressor layer is associated with at least three loss functions during training of the cuboid detector.

In a 41st aspect, the system of aspect 40, wherein the at least three loss functions comprises a log loss function and a smooth L1 loss function.

In a 42nd aspect, the system of any one of aspects 27-41, wherein RPN comprises a deep neural network (DNN).

In a 43rd aspect, the system of any one of aspects 27-42, wherein the RPN is associated with at least two loss functions during the training of the cuboid detector.

In a 44th aspect, the system of aspect 43, wherein the at least two loss functions comprises a log loss function and a smooth L1 loss function.

In a 45th aspect, the system of any one of aspects 27-44, wherein the representation of the cuboid comprises a parameterized representation of the cuboid.

In a 46th aspect, the system of aspect 45, wherein the parameterized representation comprises N tuples.

In a 47th aspect, a wearable display system is disclosed. The wearable display system comprises: an outward-facing imaging system configured to obtain an image of an environment of the wearer of the wearable display system; non-transitory memory configured to store the image; and a hardware processor in communication with the non-transitory memory, the processor programmed to: access the image of the environment; analyze the image to detect a cuboid in the image, wherein to analyze the image, the processor is programmed to: utilize layers of a convolutional neural network (CNN) to generate a convolutional feature map comprising features; utilize a region proposal network (RPN) to map the convolutional feature map into a region of interest (RoI); pool features in the RoI to generate first pooled features; pass the first pooled features through a regressor to generate a first bounding box estimate and a first cuboid vertex estimate; generate second pooled features based on the first bounding box estimate; and pass the second pooled features through the regressor to generate a second bounding box estimate and a second cuboid vertex estimate.

In a 48th aspect, the wearable display system of aspect 47, wherein the image comprises a monocular color image.

In a 49th aspect, the wearable display system of aspect 47 or aspect 48, wherein the RPN comprises a CNN that maps the convolutional feature map to the RoI.

In a 50th aspect, the wearable display system of any one of aspects 47 to 49, wherein the first bounding box estimate or the second bounding box estimate comprise offsets from a center of a bounding box.

In a 51st aspect, a system for detecting a cuboid in an image is disclosed. The system comprises: non-transitory memory configured to store an image of a region; a hardware processor in communication with the non-transitory memory, the processor programmed to: evaluate a convolutional neural network to generate a feature map; analyze the feature map to obtain a region of interest (RoI); determine that the RoI contains a cuboid; analyze first pooled features in the RoI of the feature map to generate a first estimate for vertices of the cuboid; generate an improved RoI based at least in part on the first estimate for the vertices of the cuboid; analyze second pooled features in the improved RoI of the feature map to generate a second estimate for vertices of the cuboid; and output the second estimate for vertices of the cuboid.

In a 52nd aspect, the system of aspect 51, wherein to analyze the feature map to obtain a region of interest (RoI), the processor is programmed to evaluate a region proposal network (RPN).

In a 53rd aspect, the system of aspect 51 or 52, wherein the first estimate for vertices of the cuboid comprise offsets from a center of the RoI, or the second estimate for vertices of the cuboid comprise offsets from a center of the improved RoI.

In a 54th aspect, a method for cuboid detection and keypoint localization is disclosed. The method is under control of a hardware processor and comprises: receiving an image; generating, using a plurality of convolutional layers and non-convolutional layers of a first convolutional neural network (CNN) of a cuboid detector and the image, a convolutional feature map; determining, using a region proposal network (RPN) comprising a second CNN of the cuboid detector, at least one RoI comprising a cuboid at a cuboid image location of the image; determining, using a pooling layer of the cuboid detector and the cuboid image location, a submap of the convolutional feature map corresponding to the RoI comprising the cuboid; and determining, using at least one regressor layer of the cuboid detector and the submap of the convolutional feature map corresponding to the RoI comprising the cuboid, a refined RoI at a refined cuboid image location and the representation of the cuboid.

In a 55th aspect, the method of aspect 54, further comprising: determining, using the refined cuboid image location, a refined submap of the convolutional feature map corresponding to the refined RoI comprising the cuboid; determining, using the pooling layer, the at least one regressor layer, and the refined submap of the convolutional feature map corresponding to the refined RoI comprising the cuboid, a further refined RoI at a further refined cuboid image location and a further defined representation of the cuboid.

In a 56th aspect, the method of any one of aspects 54-55, wherein the cuboid image location is represented as a two-dimensional (2D) bounding box.

In a 57th aspect, the method of any one of aspects 54-56, wherein the refined cuboid image location is represented as a two-dimensional (2D) bounding box.

In a 58th aspect, the method of any one of aspects 54-57, wherein the non-convolutional layers of the first CNN comprises a normalization layer, a brightness normalization layer, a batch normalization layer, a rectified linear layer, an upsampling layer, a concatenation layer, a pooling layer, a softsign layer, or any combination thereof.

In a 59th aspect, the method of any one of aspects 54-58, wherein the at least one regressor layer comprises two or more layers.

In a 60th aspect, the method of aspect 59, wherein the two or more layers comprise a fully connected layer, a non-fully connected layer, or any combination thereof.

In a 61st aspect, the method of any one of aspects 54-60, wherein RPN comprises a deep neural network (DNN).

In a 62nd aspect, the method of any one of aspects 54-61, wherein the representation of the cuboid comprises a parameterized representation of the cuboid.

In a 63rd aspect, the method of aspect 62, wherein the parameterized representation of the cuboid comprises locations of a plurality of keypoints of the cuboid in the image.

In a 64th aspect, the method of aspect 63, wherein the plurality of keypoints comprises eight vertices of the cuboid in the image.

In a 65th aspect, the method of aspect 62, wherein the parameterized representation comprises normalized offsets of the plurality of keypoints of the cuboid from the center of the image.

In a 66th aspect, the method of aspect 62, wherein the parameterized representation comprises N tuples.

In a 67th aspect, the method of aspect 62, wherein the parameterized representation of the cuboid comprises 12 parameters.

In a 68th aspect, the method of aspect 62, wherein the parameterized representation of the cuboid comprises a vanishing point parameterization.

In a 69th aspect, the method of any one of aspects 54-58, further comprising: interacting with a user based on the refined RoI at the refined cuboid image location and the representation of the cuboid.

In a 70th aspect, the method of aspect 69, wherein the cuboid corresponds to a stationary box, and interacting with the user comprises: generating character animation in relation to the stationary box based on the refined image location of the cuboid and the representation of the cuboid.

In a 71st aspect, the method of aspect 69, wherein the cuboid corresponds to a hand-held cuboid, and wherein interacting with the user comprises: determining a pose of the cuboid using the representation of the cuboid; and interacting with the user based on the pose of the cuboid.

In a 72nd aspect, the method of aspect 69, wherein the cuboid corresponds to a rare object not recognizable by a third CNN, and wherein interacting with the user comprises: providing the user with a notification that the rare object not recognizable by the third CNN is detected.

In a 73rd aspect, the method of any one of aspects 54-72, further comprising: assisting a user of the system during an unmanned flight based on the refined RoI at the refined cuboid image location and the representation of the cuboid, wherein the cuboid corresponds to a man-made structure.

In a 74th aspect, the method of any one of aspects 54-73, further comprising: perform simultaneous location and mapping (SLAM) based on the refined RoI at the refined cuboid image location and the representation of the cuboid, wherein the cuboid corresponds to a marker.

In a 75th aspect, the method of any one of aspects 54-74, further comprising: receiving a plurality of training images each comprising at least one training cuboid; generating the cuboid detector and training the cuboid detector comprising: determining, using the cuboid detector, a training RoI at a training cuboid image location and a representation of a training cuboid in a training image of the plurality of training images; determining a first difference between a reference cuboid image location and the training cuboid image location and a second difference between a reference representation of the training cuboid and the determined representation of the training cuboid; and updating weights of the cuboid detector based on the first difference and the second difference.

In a 76th aspect, the method of aspect 75, wherein determining the training RoI at the training cuboid image location and the representation of the training cuboid comprises: generating, using the plurality of convolutional layers and the non-convolutional layers, a training convolutional feature map for the at least one training image of the plurality of training images; determining, using the RPN, at least one training RoI comprising the training cuboid at an initial training cuboid image location in the training image; determining, using the initial training cuboid image location, a submap of the convolutional feature map corresponding to the at least one RoI comprising the cuboid; and determining, using the pooling layer, the at least one regressor layer, and the submap of the training convolutional feature map corresponding to the at least one training RoI comprising the training cuboid, the training RoI at the training cuboid image location and the representation of the training cuboid.

In a 77th aspect, the method of aspect 76, wherein the initial training cuboid image location is represented as a two-dimensional (2D) bounding box.

In a 78th aspect, the method of aspect 75, wherein determining the training RoI at the training cuboid image location and the representation of the training cuboid comprises: iteratively determining, using the pooling layer, the at least one regressor layer, and the submap of the training convolutional feature map corresponding to the training RoI comprising the training cuboid, the RoI at the training cuboid image location and the representation of the training cuboid.

In a 79th aspect, the method of aspect 78, wherein the initial training cuboid image location is represented as a two-dimensional (2D) bounding box.

In a 80th aspect, the method of any one of aspects 75-79, wherein updating weights of the cuboid detector comprises: updating the weights of the RPN and the weights of the at least one regressor layer.

In a 81st aspect, the method of any one of aspects 75-79, wherein updating weights of the cuboid detector comprises: updating the weights of the RPN and the weights of the at least one regressor layer without updating the weights of the first CNN.

In a 82nd aspect, the method of any one of aspects 75-79, wherein updating weights of the cuboid detector comprises: updating the weights of the first CNN, the weights of the RPN, and the weights of the at least one regressor layer.

In a 83rd aspect, the method of any one of aspects 54-82, wherein generating the cuboid detector comprises: receiving the first CNN.

In a 84th aspect, the method of any one of aspects 75-83, wherein the at least one regressor layer is associated with at least three loss functions during training of the cuboid detector.

In a 85th aspect, the method of claim 84, wherein the at least three loss functions comprises a log loss function and a smooth L1 loss function.

In a 86th aspect, the method of any one of aspects 75-85, wherein the RPN is associated with at least two loss functions during the training of the cuboid detector.

In a 87th aspect, the method of claim 86, wherein the at least two loss functions comprises a log loss function and a smooth L1 loss function.

In a 88th aspect, a method is disclosed. The method is under control of a hardware processor and comprises: accessing an image of the environment; analyzing the image to detect a cuboid in the image comprising utilizing layers of a convolutional neural network (CNN) to generate a convolutional feature map comprising features; utilizing a region proposal network (RPN) to map the convolutional feature map into a region of interest (RoI); pooling features in the RoI to generate first pooled features; passing the first pooled features through a regressor to generate a first bounding box estimate and a first cuboid vertex estimate; generating second pooled features based on the first bounding box estimate; and passing the second pooled features through the regressor to generate a second bounding box estimate and a second cuboid vertex estimate.

In a 89th aspect, the method of aspect 88, wherein the image comprises a monocular color image.

In a 90th aspect, the method of aspect 88 or aspect 89, wherein the RPN comprises a CNN that maps the convolutional feature map to the RoI.

In a 91st aspect, the method of any one of aspects 88 to 89, wherein the first bounding box estimate or the second bounding box estimate comprise offsets from a center of a bounding box.

In a 92nd aspect, a method for detecting a cuboid in an image is disclosed. The method is under control of a hardware processor and comprises: evaluating a convolutional neural network to generate a feature map; analyzing the feature map to obtain a region of interest (RoI); determining that the RoI contains a cuboid; analyzing first pooled features in the RoI of the feature map to generate a first estimate for vertices of the cuboid; generating an improved RoI based at least in part on the first estimate for the vertices of the cuboid; analyzing second pooled features in the improved RoI of the feature map to generate a second estimate for vertices of the cuboid; and outputting the second estimate for vertices of the cuboid.

In a 93rd aspect, the method of aspect 92, wherein analyzing the feature map to obtain a region of interest (RoI) comprises evaluating a region proposal network (RPN).

In a 94th aspect, the method of aspect 92 or 93, wherein the first estimate for vertices of the cuboid comprise offsets from a center of the RoI, or the second estimate for vertices of the cuboid comprise offsets from a center of the improved RoI.

Conclusion

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described herein may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system for cuboid detection and keypoint localization comprising:
non-transitory memory configured to store:
executable instructions,
an image for cuboid detection, and
a cuboid detector comprising:
a plurality of convolutional layers and non-convolutional layers of a first convolutional neural network (CNN) for generating a convolutional feature map from the image,
a region proposal network (RPN) comprising a second CNN for determining, using the convolutional feature map, at least one region of interest (RoI) comprising a cuboid at a cuboid image location of the image, and
a pooling layer and at least one regressor layer for determining, using the convolutional feature map and the RoI comprising the cuboid, a refined RoI at a refined cuboid image location and a representation of the cuboid;
a hardware processor in communication with the non-transitory memory, the hardware processor programmed by the executable instructions to:
receive the image;
generate, using the plurality of convolutional layers and the non-convolutional layers of the first CNN and the image, the convolutional feature map;
determine, using the RPN, the at least one RoI comprising the cuboid at the cuboid image location of the image;
determine, using the pooling layer and the cuboid image location, a submap of the convolutional feature map corresponding to the RoI comprising the cuboid; and
determine, using the at least one regressor layer and the submap of the convolutional feature map corresponding to the RoI comprising the cuboid, the refined RoI at the refined cuboid image location and the representation of the cuboid.

2. The system of claim 1, wherein the hardware processor is further programmed to:
determine, using the refined cuboid image location, a refined submap of the convolutional feature map corresponding to the refined RoI comprising the cuboid;
determine, using the pooling layer, the at least one regressor layer, and the refined submap of the convolutional feature map corresponding to the refined RoI comprising the cuboid, a further refined RoI at a further refined cuboid image location and a further defined representation of the cuboid.

3. The system of claim 1, wherein the cuboid image location is represented as a two-dimensional (2D) bounding box.

4. The system of claim 1, wherein the refined cuboid image location is represented as a two-dimensional (2D) bounding box.

5. The system of claim 1, wherein the at least one regressor layer comprises two or more layers.

6. The system of claim 5, wherein the two or more layers comprise a fully connected layer, a non-fully connected layer, or any combination thereof.

7. The system of claim 1, wherein RPN comprises a deep neural network (DNN).

8. The system of claim 1, wherein the representation of the cuboid comprises a parameterized representation of the cuboid.

9. The system of claim 8, wherein the parameterized representation of the cuboid comprises locations of a plurality of keypoints of the cuboid in the image.

10. The system of claim 9, wherein the plurality of keypoints comprises eight vertices of the cuboid in the image.

11. The system of claim 8, wherein the parameterized representation comprises normalized offsets of the plurality of keypoints of the cuboid from the center of the image.

12. The system of claim 8, wherein the parameterized representation of the cuboid comprises 12 parameters.

13. The system of claim 8, wherein the parameterized representation of the cuboid comprises a vanishing point parameterization.

14. The system of claim 1, wherein the hardware processor is further programmed to:
interact with a user of the system based on the refined RoI at the refined cuboid image location and the representation of the cuboid.

15. The system of claim 14,
wherein the cuboid corresponds to a stationary box, and
wherein to interact with the user of the system, the hardware processor is further programmed to:
generate character animation in relation to the stationary box based on the refined image location of the cuboid and the representation of the cuboid.

16. The system of claim 14,
wherein the cuboid corresponds to a hand-held cuboid, and
wherein to interact with the user of the system, the hardware processor is further programmed to:
determine a pose of the cuboid using the representation of the cuboid; and
interact with the user of the system based on the pose of the cuboid.

17. The system of claim 14,
wherein the cuboid corresponds to a rare object not recognizable by a third CNN, and
wherein to interact with the user of the system, the hardware processor is further programmed to:
provide the user with a notification that the rare object not recognizable by the third CNN is detected.

18. The system of claim 1,
wherein the cuboid corresponds to a man-made structure, and
wherein the hardware processor is further programmed to:
assist a user of the system during an unmanned flight based on the refined RoI at the refined cuboid image location and the representation of the cuboid.

19. The system of claim 1,
wherein the cuboid corresponds to a marker, and
wherein the hardware processor is further programmed to:
perform simultaneous location and mapping (SLAM) based on the refined RoI at the refined cuboid image location and the representation of the cuboid.

20. A method for cuboid detection and keypoint localization comprising, under control of a hardware processor:
receiving an image;
generating, using a plurality of convolutional layers and non-convolutional layers of a first convolutional neural network (CNN) of a cuboid detector and the image, a convolutional feature map;
determining, using a region proposal network (RPN) comprising a second CNN of the cuboid detector, at least one RoI comprising a cuboid at a cuboid image location of the image;
determining, using a pooling layer of the cuboid detector and the cuboid image location, a submap of the convolutional feature map corresponding to the RoI comprising the cuboid; and
determining, using at least one regressor layer of the cuboid detector and the submap of the convolutional feature map corresponding to the RoI comprising the cuboid, a refined RoI at a refined cuboid image location and the representation of the cuboid.

21. The method of claim 20, further comprising:
determining, using the refined cuboid image location, a refined submap of the convolutional feature map corresponding to the refined RoI comprising the cuboid;
determining, using the pooling layer, the at least one regressor layer, and the refined submap of the convolutional feature map corresponding to the refined RoI comprising the cuboid, a further refined RoI at a further refined cuboid image location and a further defined representation of the cuboid.

22. The method of claim 20, wherein the cuboid image location is represented as a two-dimensional (2D) bounding box, and wherein the refined cuboid image location is represented as a two-dimensional (2D) bounding box.

23. The method of claim 20, wherein the non-convolutional layers of the first CNN comprises a normalization layer, a brightness normalization layer, a batch normalization layer, a rectified linear layer, an upsampling layer, a concatenation layer, a pooling layer, a softsign layer, or any combination thereof.

24. The method of claim 20, wherein the at least one regressor layer comprises two or more layers, and wherein the two or more layers comprise a fully connected layer, a non-fully connected layer, or any combination thereof.

25. The method of claim 20, wherein the representation of the cuboid comprises a parameterized representation of the cuboid comprising locations of a plurality of keypoints of the cuboid in the image.

* * * * *